(12) United States Patent
Fukuda

(10) Patent No.: US 9,793,299 B2
(45) Date of Patent: *Oct. 17, 2017

(54) DISPLAY DEVICE AND HAND-HELD ELECTRONIC DEVICE

(71) Applicants: Japan Display Inc., Tokyo (JP);
Panasonic Liquid Crystal Display Co., Ltd., Hyogo-ken (JP)

(72) Inventor: Koichi Fukuda, Tokyo (JP)

(73) Assignees: Japan Display Inc., Tokyo (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 235 days.

This patent is subject to a terminal disclaimer.

(21) Appl. No.: 14/624,339

(22) Filed: Feb. 17, 2015

(65) Prior Publication Data

US 2015/0162353 A1  Jun. 11, 2015

Related U.S. Application Data

(63) Continuation of application No. 14/020,331, filed on Sep. 6, 2013, now Pat. No. 9,013,653, which is a (Continued)

(30) Foreign Application Priority Data

Dec. 26, 2005 (JP) ................. 2005-372185

(51) Int. Cl.
*G02F 1/1333* (2006.01)
*H01L 27/12* (2006.01)
(Continued)

(52) U.S. Cl.
CPC .......... *H01L 27/124* (2013.01); *G02F 1/1333* (2013.01); *G02F 1/1339* (2013.01);
(Continued)

(58) Field of Classification Search
None
See application file for complete search history.

(56) References Cited

U.S. PATENT DOCUMENTS 5,793,461 A  8/1998 Inou
6,084,652 A  7/2000 Yamahara
(Continued)

FOREIGN PATENT DOCUMENTS

CN  1211746  3/1999
CN  1441453  9/2003
(Continued)

*Primary Examiner* — Phu Vu
(74) *Attorney, Agent, or Firm* — Typha IP LLC

(57) ABSTRACT

An electronic device includes a liquid crystal display device having a first substrate, a second substrate bonded to the first substrate, with liquid crystal material held between the first substrate and the second substrate, and an upper polarizing plate affixed to the second substrate. A protective member is disposed over the upper polarizing plate, and an adhesive member is disposed between the protective member and the upper polarizing plate without an air layer between the protective member and the upper polarizing plate. The protective member is configured as a protective cover of the electronic device.

16 Claims, 15 Drawing Sheets

Related U.S. Application Data continuation of application No. 13/446,331, filed on Apr. 13, 2012, now Pat. No. 8,558,965, which is a continuation of application No. 13/279,587, filed on Oct. 24, 2011, now Pat. No. 8,164,717, which is a continuation of application No. 12/437,218, filed on May 7, 2009, now Pat. No. 8,045,101, which is a continuation of application No. 11/644,872, filed on Dec. 26, 2006, now Pat. No. 7,532,274.

(51) Int. Cl.
    *G02F 1/1335*      (2006.01)
    *G02F 1/1339*      (2006.01)
    *G02F 1/1368*      (2006.01)

(52) U.S. Cl.
    CPC ...... *G02F 1/1368* (2013.01); *G02F 1/133305* (2013.01); *G02F 1/133308* (2013.01); *G02F 1/133528* (2013.01); *G02F 1/133536* (2013.01); *G02F 1/133608* (2013.01); *G02F 2201/50* (2013.01)

(56) References Cited

U.S. PATENT DOCUMENTS

| | | | |
|---|---|---|---|
| 7,166,352 B2 | 1/2007 | Watanabe | |
| 7,285,323 B2 | 10/2007 | Sone | |
| 7,532,274 B2 | 5/2009 | Fukuda | |
| 8,558,965 B2 | 10/2013 | Fukuda | |
| 9,013,653 B2* | 4/2015 | Fukuda | G02F 1/1333 349/58 |
| 2001/0043297 A1 | 11/2001 | Arai | |
| 2004/0051827 A1 | 3/2004 | Hinata | |
| 2005/0046783 A1 | 3/2005 | Kawata | |
| 2005/0146650 A1 | 7/2005 | Chung | |
| 2005/0158665 A1* | 7/2005 | Maekawa | G02B 5/201 430/313 |
| 2005/0243245 A1 | 11/2005 | Taguchi | |
| 2005/0271835 A1 | 12/2005 | Kim | |
| 2006/0109395 A1* | 5/2006 | Yamamoto | G02B 6/005 349/58 |
| 2006/0152664 A1 | 7/2006 | Nishio | |
| 2008/0055522 A1 | 3/2008 | Sakaguchi | |

FOREIGN PATENT DOCUMENTS

| | | |
|---|---|---|
| CN | 1512216 | 7/2004 |
| JP | H01-015516 | 8/1993 |
| JP | H08-006039 | 1/1996 |
| JP | H08-110821 | 4/1996 |
| JP | H08-338912 | 12/1996 |
| JP | 2003-195043 | 7/2003 |
| JP | 2003-337322 | 11/2003 |
| JP | 2003-337549 | 11/2003 |
| JP | 2005-037927 | 2/2005 |
| JP | 2005-134841 | 5/2005 |
| JP | 2005-189571 | 7/2005 |

* cited by examiner

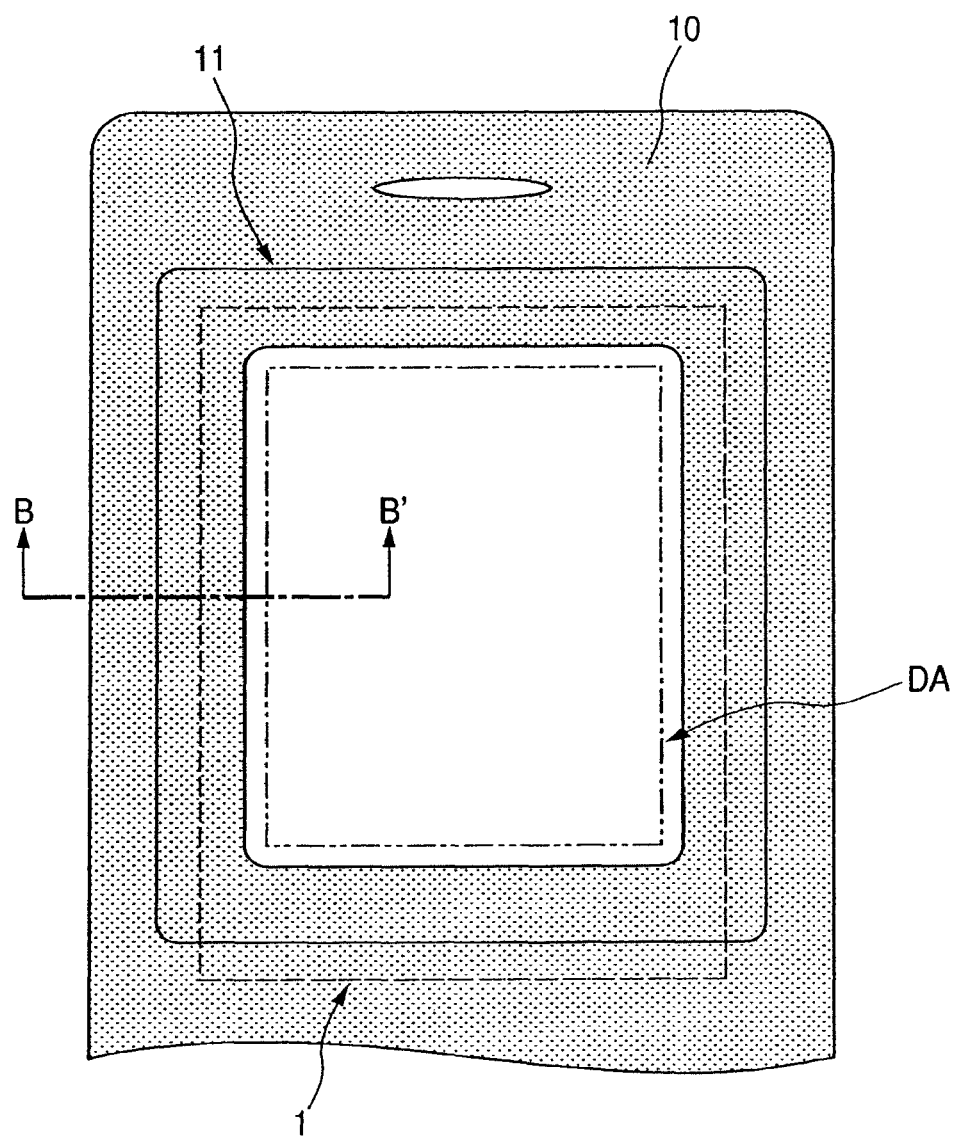

DISPLAY DEVICE AND HAND-HELD ELECTRONIC DEVICE

CROSS REFERENCE TO RELATED APPLICATION

This application is a continuation of U.S. application Ser. No. 14/020,331, filed Sep. 6, 2013, which is a continuation of U.S. application Ser. No. 13/446,331, filed Apr. 13, 2013, now U.S. Pat. No. 8,558,965, which is a continuation of U.S. application Ser. No. 13/279,587, filed Oct. 24, 2011, now U.S. Pat. No. 8,164,717, which is a continuation of U.S. application Ser. No. 12/437,218, filed May 7, 2009, now U.S. Pat. No. 8,045,101, which is a continuation application of U.S. application Ser. No. 11/644,872, filed Dec. 26, 2006, now U.S. Pat. No. 7,532,274, the contents of which are incorporated herein by reference.

CLAIM OF PRIORITY

The present application claims priority from Japanese Application JP 2005-372185 filed on Dec. 26, 2005, the content of which is hereby incorporated by reference into this application.

BACKGROUND OF THE INVENTION

Field of the Invention

The present invention relates to a liquid crystal display and a display. In particular, the present invention is concerned with a technique applicable effectively to a liquid crystal display (module) used in a hand-held electronic device such as a mobile telephone terminal.

Description of the Related Art

A thin display such as a liquid crystal display has been conventionally used for a display used in a hand-held electronic device such as a mobile telephone terminal or a PDA (Personal Digital Assistant).

The liquid crystal display is a display having a liquid crystal display panel comprising a pair of substrates and a liquid crystal material held therebetween. One of the paired substrates is generally called a TFT substrate and, for example, comprises a glass substrate, as well as TFTs (Thin Film Transistor) and pixel electrodes formed on the substrate. The other substrate is generally called a counter substrate and, for example, comprises a glass substrate and a color filter, etc. formed thereon. In the case where the liquid crystal material driving method is a longitudinal electric field type, common electrodes (also called counter electrodes) opposed to the pixel electrodes are formed on the counter substrate side. In the case where the liquid crystal material driving method is a lateral electric field type, the common electrodes are formed on the TFT substrate side.

With the recent tendency toward the reduction in thickness of the hand-held electronic device, the liquid crystal display used therein has also been becoming more and more thin. For example, as a method of reducing the thickness of a liquid crystal panel, the method of reducing the thickness of the liquid crystal display is known.

For example, a method of polishing the glass substrate used in the TFT substrate or the counter substrate is known as the method of reducing the thickness of the liquid crystal display panel.

Also, as a method of reducing the thickness of a liquid crystal display panel, the method of using a plastic substrate for either one of the TFT substrate or the counter substrate instead of the glass substrate (see, for example, Japanese Patent Laid-Open No. 8-006039 (Patent Document 1)) is known.

SUMMARY OF THE INVENTION

In the liquid crystal display, when the thickness of the glass substrate used in the TFT substrate or the counter substrate is reduced by polishing in order to reduce the thickness of the liquid crystal display panel, the strength of the glass substrate is deteriorated and the strength of the liquid crystal display panel is also deteriorated. Thus, the method of polishing the glass substrate to reduce the substrate thickness poses the problem that it is difficult to attain both thickness reduction and ensuring of a sufficient strength.

Moreover, the method of using a plastic substrate instead of the glass substrate poses the problem that the heat resistance and solvent resistance (chemicals resistance) of the plastic substrate are low in comparison with the glass substrate and that therefore the handling of the plastic substrate is difficult for example in the step of forming TFT onto the glass substrate. Further, in the case of a liquid crystal display panel using a glass substrate as the TFT substrate and a plastic substrate as the counter substrate, unevenness in display easily occurs because the substrates differ in the amount of deformation caused by changes of environmental conditions such as temperature and humidity.

It is an object of the present invention to provide a technique able to attain both thickness reduction of a liquid crystal display panel and ensuring of a sufficient strength of the panel.

It is another object of the present invention to provide a technique able to reduce the thickness of a hand-held electronic device such as a liquid crystal display (module).

The above and other objects and novel features of the present invention will become apparent from the following description and the accompanying drawings.

The following is an outline of typical modes of the present invention as disclosed herein.

(1) A liquid crystal display comprising a liquid crystal display panel, the liquid crystal display panel having a first substrate, a second substrate disposed on the side of an observer with respect to the first substrate and opposed to the first substrate, a liquid crystal held between the first substrate and the second substrate, an upper polarizing plate disposed on the observer side with respect to the second substrate, and a resin film disposed on the observer side with respect to the upper polarizing plate and affixed in contact with the upper polarizing plate, the resin film being higher in surface hardness than the upper polarizing plate.

(2) The liquid crystal display according to the above (1), wherein the resin film has a surface hardness of 3H or harder in terms of surface pencil hardness.

(3) The liquid crystal display according to the above (1) or (2), wherein the resin film has a thickness of 0.2 mm or more.

(4) The liquid crystal display according to the above (1) or (2), wherein the resin film has a thickness of 0.2 mm or more and 1 mm or less.

(5) The liquid crystal display according to any one of the above (1) to (4), wherein the material of the resin film is an acrylic resin or an epoxy resin.

(6) The liquid crystal display according to any one of the above (1) to (5), wherein the first substrate has a thickness of 0.5 mm or less.

(7) The liquid crystal display according to any one of the above (1) to (6), wherein the second substrate has a thickness of 0.5 mm or less.

(8) The liquid crystal display according to any one of the above (1) to (7), wherein the thickness of the first substrate and that of the second substrate are almost equal to each other.

(9) The liquid crystal display according to any one of the above (1) to (7), wherein the thickness of the second substrate is smaller than that of the first substrate.

(10) The liquid crystal display according to any one of the above (1) to (7), wherein the thickness of the second substrate is larger than that of the first substrate.

(11) The liquid crystal display according to any one of the above (1) to (10), wherein the total thickness of the liquid crystal display panel is 2 mm or less.

(12) The liquid crystal display according to any one of the above (1) to (11), further comprising an upper phase difference plate disposed between the upper polarizing plate and the second substrate.

(13) The liquid crystal display according to any one of the above (1) to (12), wherein when the liquid crystal display panel is viewed from a front side thereof, an outline of the resin film is smaller than that of the upper polarizing plate.

(14) The liquid crystal display according to any one of the above (1) to (12), wherein the liquid crystal display panel further comprises a lower polarizing plate disposed on a back surface side of the first substrate, and when the liquid crystal display panel is viewed from the front side thereof, an outline of the resin film and that of the upper polarizing plate are smaller than an outline of the lower polarizing plate.

(15) The liquid crystal display according to the above (14), further comprising a lower phase difference plate disposed between the lower polarizing plate and the first substrate.

(16) The liquid crystal display according to any one of the above (1) to (15), wherein the first substrate and the second substrate are glass substrates.

(17) A liquid crystal display comprising a liquid crystal display panel, the liquid crystal display panel having a first substrate, a second substrate disposed on an observer side with respect to the first substrate and opposed to the first substrate, a liquid crystal held between the first substrate and the second substrate, an upper polarizing plate disposed on the observer side with respect to the second substrate, and a resin film disposed between the upper polarizing plate and the second substrate, the resin film having a thickness of 0.2 mm or more, the upper polarizing plate having a surface hardness of 3H or harder in terms of surface pencil hardness.

(18) The liquid crystal display according to the above (17), wherein the resin film has a thickness of 1 mm or less.

(19) The liquid crystal display according to the above (17) or (18), wherein the thickness of the first substrate and that of the second substrate are almost equal to each other.

(20) The liquid crystal display according to the above (17) or (18), wherein the thickness of the second substrate is smaller than that of the first substrate.

(21) The liquid crystal display according to the above (17) or (18), wherein the thickness of the second substrate is larger than that of the first substrate.

(22) The liquid crystal display according to any one of the above (17) to (21), further comprising an upper phase difference plate disposed between the upper polarizing plate and the second substrate.

(23) The liquid crystal display according to any one of the above (17) to (22), wherein when the liquid crystal display panel is viewed from a front side thereof, an outline of the upper polarizing plate is smaller than that of the resin film.

(24) The liquid crystal display according to any one of the above (17) to (23), wherein the liquid crystal display panel further comprises a lower polarizing plate disposed on a back surface side of the first substrate, and when the liquid crystal display panel is viewed from the front side thereof, an outline of the upper polarizing plate is smaller than that of the lower polarizing plate.

(25) The liquid crystal display according to the above (24), wherein when the liquid crystal display panel is viewed from the front side thereof, an outline of the resin film is smaller than that of the lower polarizing plate.

(26) The liquid crystal display according to the above (24), wherein when the liquid crystal display panel is viewed from the front side thereof, an outline of the resin film is larger than that of the lower polarizing plate.

(27) The liquid crystal display according to any one of the above (24) to (26), further comprising a lower phase difference plate disposed between the lower polarizing plate and the first substrate.

(28) The liquid crystal display according to any one of the above (17) to (27), wherein the first substrate and the second substrate are glass substrates.

(29) A liquid crystal display comprising a liquid crystal display panel, the liquid crystal display panel having a first substrate, a second substrate disposed on an observer side with respect to the first substrate and opposed to the first substrate, a liquid crystal held between the first substrate and the second substrate, an upper polarizing plate disposed on the observer side with respect to the second substrate, a lower polarizing plate disposed on a back surface side of the first substrate, and a resin film affixed in contact with a back surface side of the lower polarizing plate, wherein the total thickness of the first substrate and the second substrate is 0.5 mm or less.

(30) The liquid crystal display according to the above (29), wherein the resin film has a thickness of 0.1 mm or more and 0.3 mm or less.

(31) The liquid crystal display according to the above (29) or (30), wherein the thickness of the first substrate and that of the second substrate are almost equal to each other.

(32) The liquid crystal display according to the above (29) or (30), wherein the thickness of the second substrate is smaller than that of the first substrate.

(33) The liquid crystal display according to the above (29) or (30), wherein the thickness of the second substrate is larger than that of the first substrate.

(34) The liquid crystal display according to any one of the above (29) to (33), wherein the first substrate and the second substrate are glass substrates.

(35) A liquid crystal display comprising a liquid crystal display panel, the liquid crystal display panel having a first substrate, a second substrate disposed on an observer side with respect to the first substrate and opposed to the first substrate, a liquid crystal held between the first substrate and the second substrate, an upper polarizing plate disposed on the observer side with respect to the second substrate, a lower polarizing plate disposed on a back surface side of the first substrate, and a resin film disposed between the lower polarizing plate and the first substrate, wherein the total thickness of the first substrate and the second substrate is 0.5 mm or less.

(36) The liquid crystal display according to the above (35), wherein the resin film has a thickness of 0.1 mm or more and 0.3 mm or less.

(37) The liquid crystal display according to the above (35) or (36), wherein the thickness of the first substrate and that of the second substrate are almost equal to each other.

(38) The liquid crystal display according to the above (35) or (36), wherein the thickness of the second substrate is smaller than that of the first substrate.

(39) The liquid crystal display according to the above (35) or (36), wherein the thickness of the second substrate is larger than that of the first substrate.

(40) The liquid crystal display according to any of the above (35) to (39), wherein the first substrate and the second substrate are glass substrates.

(41) A display comprising a display panel, the display panel comprising a first substrate, a second substrate disposed on an observer side with respect to the first substrate and opposed to the first substrate, and an upper polarizing plate disposed on the observer side with respect to the second substrate, wherein the first substrate and the second substrate are glass substrates and there is provided a resin film disposed on the observer side with respect to the upper polarizing plate and affixed in contact with the upper polarizing plate, the resin film having a surface hardness of 3H or harder in terms of surface pencil hardness.

In connection with the liquid crystal display according to the present invention, in the liquid crystal display of the first invention (1), a resin film is affixed in contact with the upper polarizing plate of the liquid crystal display panel, the resin film having a surface hardness higher than that of the upper polarizing plate. In the liquid crystal display panel having such a resin film, the resin film functions as a reinforcing member, whereby the strength of the liquid crystal display panel is enhanced. Therefore, even if one or both of the first and second substrates are reduced in thickness, it is possible to ensure a sufficient strength of the liquid crystal display panel. With the resin film having the surface pencil hardness of 3H or harder, the liquid crystal display panel becomes difficult to be damaged. Consequently, when the liquid crystal display (module) having this liquid crystal display panel is installed into a mobile telephone terminal, a protective cover for protecting the liquid crystal display panel is not necessary to be attached to the outer surface of the mobile telephone terminal. As a result, a display unit of the mobile telephone terminal can be made thin.

It is preferable that the thickness of the resin film be, for example, 0.2 mm or more and 1 mm or less. It is preferable that the resin film be formed of a material high in light transmittance, especially a colorless, transparent material. As an example of such a material there is an acrylic resin or an epoxy resin. In the case of using an acrylic resin or an epoxy resin as the material of the resin film, the surface of the resin is subjected to a hard coating treatment so as to give a surface pencil hardness of 3H or harder. the surface pencil hardness is meant a hardness with which the material surface is damaged when a line is drawn on the material surface with a pencil. That is, the surface pencil hardness of 3H means that the film surface gets not damaged when a line is drawn on the film surface with a pencil with a pencil hardness of 3H or softer.

It is preferable that the first and second substrates each have a thickness of 0.5 mm or less. The thickness of the first substrate and that of the second substrate may be almost equal to or different from each other. In particular, the second substrate with the resin film affixed thereto is reinforced by the resin film and therefore, even if it is thinner than the first substrate, it is possible to ensure a sufficient strength. For example, in the case where the liquid crystal display panel is of a lateral electric field driving type called IPS (In Plane Switching), a conductor film for the prevention of electric charging may be provided on the surface to which the upper polarizing plate is affixed. In this case, for example, it is impossible to reduce the thickness of the second substrate by polishing. Therefore, in the case where the aforesaid conductor film is provided on the second substrate, the first substrate is made thinner than the second substrate to reduce the thickness of the liquid crystal display panel. In this case, it is preferable that the thickness of the resin film, that of the first substrate and that of the second substrate be set so as to give a liquid crystal display panel thickness of 2 mm or less.

In such a liquid crystal display panel, it is preferable that an outline of the resin film be smaller than that of the upper polarizing plate for example when the panel is viewed from the front side thereof. For example, when the liquid crystal display having the liquid crystal display panel is installed into a mobile telephone terminal, there usually is formed a slight gap between the sheath of the mobile telephone terminal and the liquid crystal display panel, and water gets into the inside of the mobile telephone terminal from the outside through the gap. In this case, the outline of the resin film is made smaller than that of the upper polarizing plate, whereby the upper polarizing plate and the sheath of the mobile telephone terminal can be affixed together between the outer periphery of the resin film and that of the upper polarizing plate using a pressure-sensitive adhesive or the like to fill up the gap. In this way it is possible to prevent the entry of water into the inside of the sheath.

In such a liquid crystal panel, for example, the lower polarizing plate may be disposed on the back surface side of the first substrate. In this case, for example when the liquid crystal display panel is viewed from the front side, it is preferable that the outline of the resin film and that of the upper polarizing plate be smaller than the outline of the lower polarizing plate.

In such a liquid crystal display panel, for example, an upper phase difference plate may be disposed between the upper polarizing plate and the second substrate. Likewise, a lower phase difference plate may be disposed between the lower polarizing plate and the first substrate.

In such a liquid crystal display panel it is preferable that both first and second substrates be glass substrates. Even in the case of using glass substrates as the first and second substrates, it is possible to reduce the thickness of each glass substrate because a sufficient strength can be ensured by the resin film. Thus, it is possible to attain both the reduction in thickness of the liquid crystal display panel and ensuring of a sufficient strength.

In connection with the liquid crystal display according to the present invention, in the liquid crystal display of the second invention (17), the resin film is disposed between the second substrate and the upper polarizing plate of the liquid crystal display panel. Also in this case it is preferable that the thickness of the resin film be, for example, 0.2 mm or more and 1 mm or less. In such a liquid crystal display panel, since the upper polarizing plate is disposed most closely to the observer, the surface pencil hardness of the resin film is not required to be 3H or harder. Instead, in the liquid crystal display of the second invention it is preferable that the surface of the upper polarizing plate be subjected to a hard coating treatment so as to become 3H or harder in surface pencil hardness. With this configuration, it is possible to obtain the same effect as in the liquid crystal display (liquid crystal display panel) of the first invention.

Also in the liquid crystal display of the second invention, the thickness of the first substrate and that of the second substrate may be almost equal to each other or either one of the first or second substrates may be reduced in thickness.

Also in the liquid crystal display of the second invention it is preferable that the outline of the resin film be smaller than that of the upper polarizing plate for example when the liquid crystal display panel is viewed from the front side thereof.

In the liquid crystal display of the second invention, for example, a lower polarizing plate may be disposed on the back surface side of the first substrate. In this case, it is preferable that the outline of the resin film and that of the upper polarizing plate be smaller than the outline of the lower polarizing plate for example when the liquid crystal display panel is viewed from the front side thereof.

Moreover, in the liquid crystal display of the second invention, for example, an upper phase difference plate may be disposed between the upper polarizing plate and the second substrate. Likewise, a lower phase difference plate may be disposed between the lower polarizing plate and the first substrate. The upper phase difference plate may be disposed between the second substrate and the resin film or may be disposed between the resin film and the upper polarizing plate.

Further, in the liquid crystal display of the second invention it is preferable that both first and second substrates be glass substrates. Even in the case of using glass substrates as the first and second substrates, the glass substrates can be made thin because a sufficient strength can be ensured by the resin film. Thus, it is possible to attain both the reduction in thickness of the liquid crystal display panel and ensuring of a sufficient strength.

In connection with the liquid crystal display according to the present invention, in the liquid crystal display of the third invention (29), a resin film is affixed in contact with the back surface side of the lower polarizing plate of the liquid crystal display panel and the total thickness of both first and second substrates is 0.5 mm or less. In such a liquid crystal panel it is preferable that the thickness of the resin film be, for example, 0.1 mm or less and 0.3 mm or more. With such a thickness, when a pressing force is applied to the liquid crystal display panel from the upper polarizing plate side, the resin film can bear the force, the resin film being affixed to the back surface side of the display panel. Thus, even if the first and second substrates are made thin, it is possible to ensure a sufficient strength of the liquid crystal display panel.

Also in the liquid crystal display of the third invention, the thickness of the first substrate and that of the second substrate may be almost equal to each other, or either one of the first or second substrates may be reduced in thickness.

Moreover, in the liquid crystal display of the third invention, it is preferable that both first and second substrates be glass substrates. Even in the case of using glass substrates as the first and second substrates, it is possible to reduce the thickness of each glass substrate because a sufficient strength can be ensured by the resin film. Thus, it is possible to attain both the reduction in thickness of the liquid crystal display panel and ensuring of a sufficient strength.

In connection with the liquid crystal display according to the present invention, in the liquid crystal display of the fourth invention (35), the resin film is disposed between the first substrate and the lower polarizing plate of the liquid crystal display panel and the total thickness of the first and second substrates is 0.5 mm or less. Also in this case it is preferable that the thickness of the resin film be, for example, 0.1 mm or more and 0.3 mm or less. According to this construction, the same effect can be obtained as in the liquid crystal display of the third invention.

Also in the liquid crystal display of the fourth invention, the thickness of the first substrate and that of the second substrate may be almost equal to each other, or either one of the first or second substrates may be reduced in thickness.

Moreover, in the liquid crystal display of the fourth invention it is preferable that both first and second substrates be glass substrates. Even in the case of using glass substrates as the first and second substrates it is possible to reduce the thickness of each glass substrate because a sufficient strength can be ensured by the resin film. Thus, it is possible to attain both thinning of the liquid crystal display panel and ensuring of a sufficient strength.

In the case of installing the liquid crystal display of the third or the fourth invention into a mobile telephone terminal, it is preferable that a protective cover for protecting the liquid crystal display panel be affixed to a sheath of the mobile telephone terminal as in the conventional liquid crystal display. However, in the liquid crystal displays of third and fourth inventions, the total thickness of the first and second substrates is not larger than 0.5 mm and the thickness of the resin film is 0.1 mm or more and 0.3 mm or less. That is, in each of the liquid crystal displays of the third and fourth inventions, since the liquid crystal display panel is thinner than the conventional liquid crystal display panel, the thickness of the liquid crystal display can be so much reduced. Consequently, even if the protective cover for protecting the liquid crystal display panel is affixed to the sheath of the mobile telephone terminal, it is possible to reduce the thickness of the display unit of the mobile telephone terminal in comparison with the conventional counterpart.

Although the first invention is concerned with a liquid crystal display, the same construction as the first invention is applicable to any display insofar as the display has a liquid crystal panel of a construction similar to the construction of the liquid crystal display panel used in the liquid crystal display. For example, even in the case of a display panel with a liquid crystal material not held between the first and second substrates, if an upper polarizing plate is disposed on the observer side with respect to the second substrate, both thinning of the liquid crystal panel and ensuring of a sufficient strength can be attained by affixing the resin film in contact with the upper polarizing plate. In this connection, if the surface pencil hardness of the resin film is 3H or harder, then as is the case with the liquid crystal display of the first invention, for example when the liquid crystal display in question is installed into a mobile telephone terminal, it is no longer required to use a liquid crystal display panel protecting cover and hence it is possible to reduce the thickness of the display unit of the mobile telephone terminal. As an example of a display panel having a configuration similar to that of the liquid crystal display panel and not using any liquid crystal material, there is known a self-light emission type display panel using an organic EL.

BRIEF DESCRIPTION OF THE DRAWINGS

FIG. 4 is a schematic front view showing a schematic configuration of a display unit of a conventional mobile telephone terminal;

DETAILED DESCRIPTION OF PREFERRED EMBODIMENTS

Figure 1:
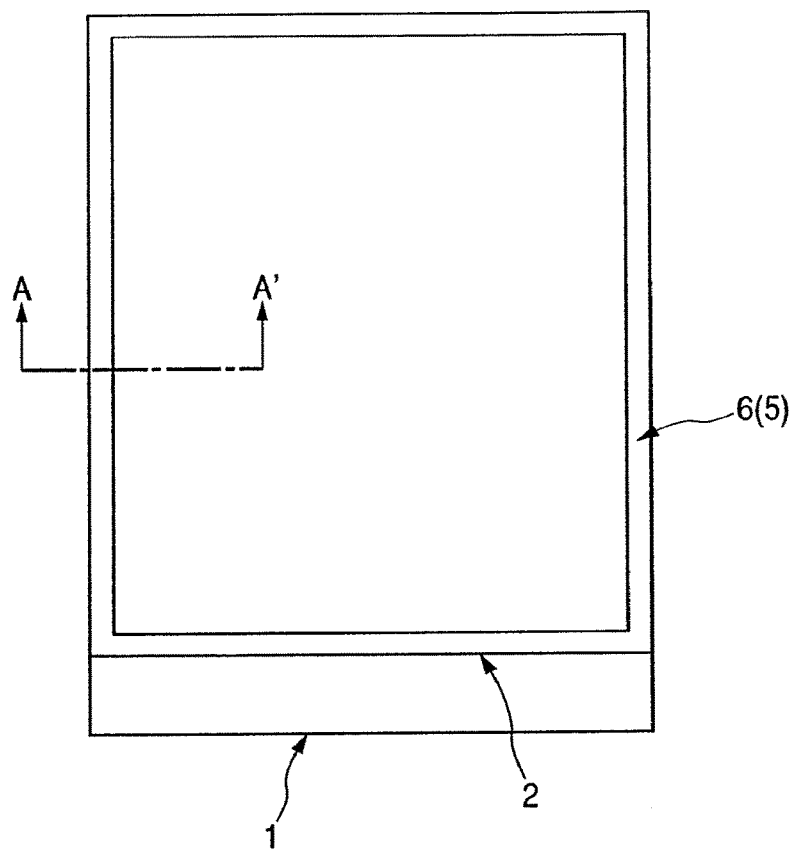
FIG. 1 is a schematic plan view showing a schematic configuration of a liquid crystal display panel according to a first embodiment of the present invention.

The present invention will be described in detail by way of embodiments thereof and with reference to the accompanying drawings.

In all of the drawings for illustration of the embodiments, portions having the same functions are identified by the same reference numerals, and repeated explanations thereof will be omitted.

First Embodiment

Figure 2:
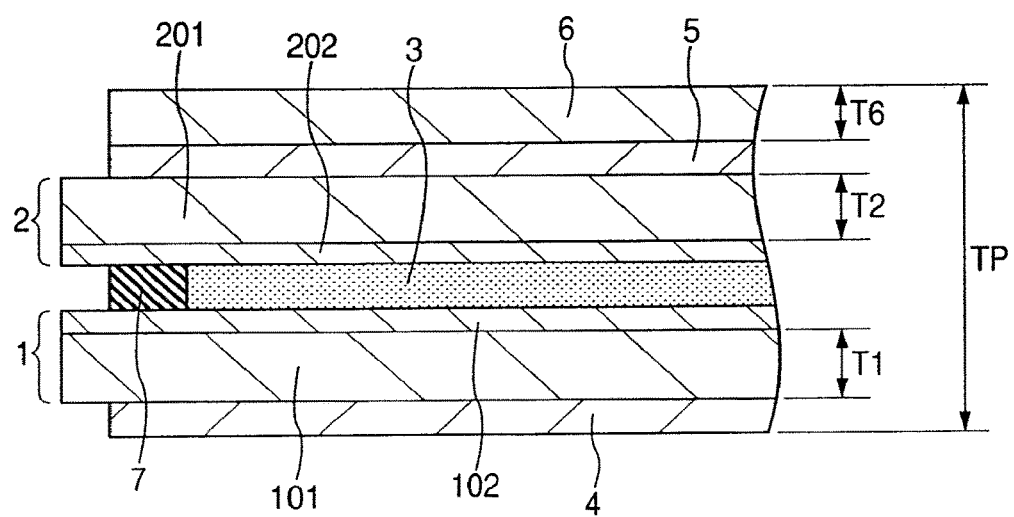
FIG. 2 is a sectional view taken along the line A-A' of FIG. 1.
Figure 3A:
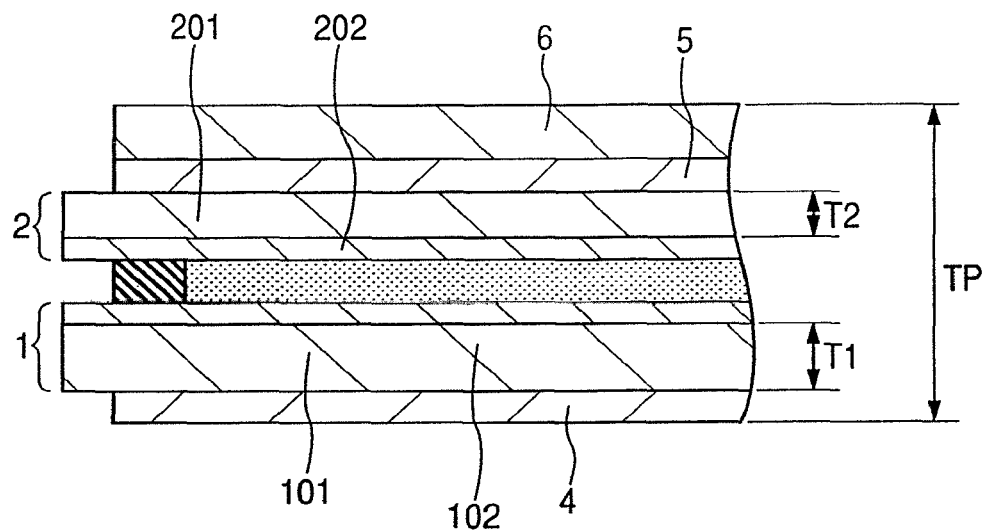
FIGS. 3A and 3B are schematic sectional views for explaining a function and effect of the liquid crystal display panel of the first embodiment.
Figure 3B:
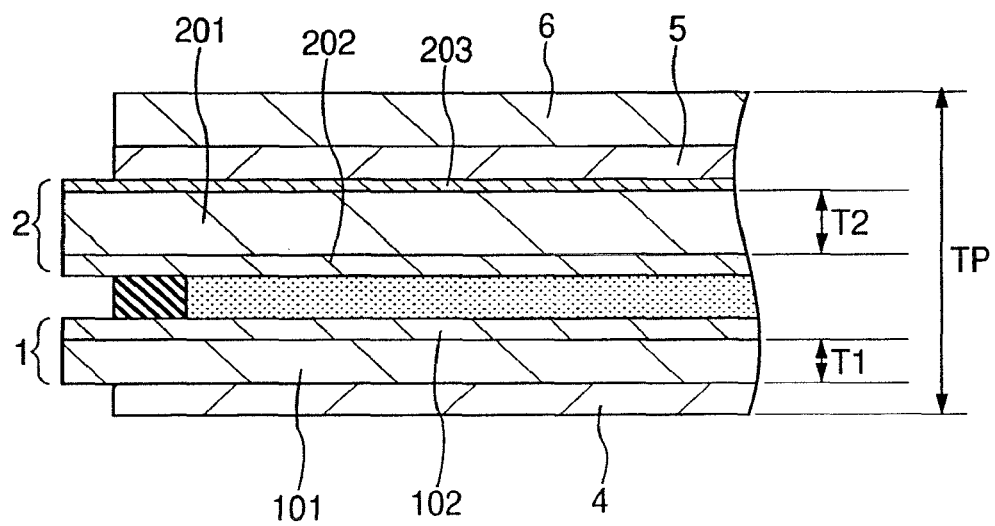

FIG. 1 is a schematic plan view showing a schematic configuration of a liquid crystal display panel according to a first embodiment of the present invention, FIG. 2 is a sectional view taken along the line A-A' of FIG. 1, and FIG. 3 is a schematic sectional view for explaining a function and effect of the liquid crystal display panel of the first embodiment. In FIG. 3 there are shown two sectional views as FIG. 3A and FIG. 3B, both of which correspond to the sectional configuration taken along the line A-A' in FIG. 1.

In the first embodiment, a reference will be made to a transmission type liquid crystal display as an example of a display to which the present invention is applied, and a description will be given below about the configuration, as well as function and effect, of a liquid crystal display panel used in the transmission type liquid crystal display.

As shown in FIG. 1, the liquid crystal display panel of the first embodiment includes a TFT substrate 1, a counter substrate 2, a liquid crystal material 3 held between the TFT substrate 1 and the counter substrate 2, a pair of polarizing plates 4, 5 disposed between the TFT substrate and the counter substrate 2 both holding the liquid crystal material 3, and a resin film 6 affixed in contact with the polarizing plate 5 which is located on the counter substrate 2 side.

The TFT substrate 1 and the counter substrate 2 are bonded together through an annular sealing member 7 and the liquid crystal material 3 is sealed and held within the space enclosed by the TFT substrate 1, counter substrate 2 and sealing member 7.

In the display having such a liquid crystal display panel, when seen from an observer side, the counter substrate 2 is usually disposed on the observer side with respect to the TFT substrate. That is, when the liquid crystal display panel of the first embodiment is viewed from the observer side, the resin film 6, polarizing plate 5, counter substrate 2, liquid crystal material 3, TFT substrate 1 and polarizing plate 4 are disposed in this order from the observer side. Therefore, in the following description, the polarizing plate 5 disposed on the observer side (front side) with respect to the counter substrate 2 when seen from the observer side will be designated the upper polarizing plate, while the polarizing plate 4 disposed on the back surface side (back side) of the TFT substrate will be designated the lower polarizing plate.

The TFT substrate 1 includes a glass substrate 101 and a multi-thin film layer 102. Though detailed descriptions are omitted, the multi-thin film layer 102 is a laminate of plural insulating layers, conductive layer, semiconductor layer and the like. For example, a scanning signal line (also called a gate signal line), a video signal line (also called a drain signal line), TFT and pixel electrodes are formed in the multi-thin film layer 102.

The counter substrate 2 includes a glass substrate 201 and a multi-thin film layer 202. Though detailed descriptions are omitted, the multi-thin film layer 202 is a laminate of plural insulating layers and conductive layer, forming a color filter for example.

In the case where the driving method for the liquid crystal display panel is of a longitudinal electric field type, common electrodes are also formed in the multi-thin film layer 202 of the counter substrate 2 and opposed to the pixel electrodes of the TFT substrate 1. Where the driving method for the liquid crystal display panel is of a lateral electric field type, the common electrodes are formed in the multi-thin film layer 102 of the TFT substrate 1.

Any of various combinations applied to conventional liquid crystal display panels may be adopted for the combination of the configuration of the multi-thin film layer 102 of the TFT substrate and the multi-thin film layer 202 of the counter substrate 2. Therefore, detailed descriptions on concrete structural examples of the multi-thin film layers 102 and 202 will be here omitted.

The lower polarizing plate 4 is affixed in contact with the glass substrate 101 in the TFT substrate 1 through a pressure-sensitive adhesive for example. Likewise, the upper polarizing plate 5 is also affixed in contact with the glass substrate 201 of the counter substrate 2 through a pressure-sensitive adhesive for example. In this case, the upper polarizing plate 4 and the lower polarizing plate 5 are affixed to the glass substrates in such a manner that their transmission axes (also called polarization axes) intersect each other perpendicularly or are parallel to each other. For the lower polarizing plate 4 and the upper polarizing plate 5, for example, film-like polarizing plates used in conventional liquid crystal display panels may be used. Detailed descriptions on concrete structural examples of the material, etc. will be here omitted.

In the liquid crystal display panel of the first embodiment, though not shown, a phase difference plate may be disposed between the glass substrate of the TFT substrate 1 and the lower polarizing plate 4 and also between the glass substrate 201 of the counter substrate 2 and the upper polarizing plate 5.

The resin film 6 is a film member disposed on the most front side when viewed from the observer side. Therefore, it is preferable that a film with a high light transmittance, especially a colorless, transparent film be used as the resin film 6. For example, an acrylic resin film or an epoxy resin film may be used as the resin film 6. The resin film 6 is affixed in contact with the upper polarizing plate through a pressure-sensitive adhesive for example.

In the liquid crystal display panel of the first embodiment it is preferable that the resin film 6 have a thickness, T6, of 0.2 mm or more and 1.0 mm or less. If the thickness T6 of the resin film 6 is 0.2 mm or more, a sufficient strength of the liquid crystal panel can be ensured even if the glass substrate 101 of the TFT substrate and the glass substrate 201 of the counter electrode 2 are each made as thin as 0.5 mm or less. Therefore, in the liquid crystal display panel of the first embodiment, a sufficient strength can be ensured even if the total panel thickness, TP, is 2 mm or less. In the liquid crystal display panel of this embodiment it is preferable that the total panel thickness TP be not larger than 2 mm and the panel thickness, TP-T6, exclusive of the resin film be not larger than 1.3 mm.

Since the resin film 6 exhibits a function as a reinforcing member for the liquid crystal display panel, for example, as shown in FIG. 3A, the thickness T2 of the glass substrate 201 of the counter substrate 2 with the resin film 6 affixed thereto can be made thinner than the thickness T1 of the glass substrate 101 of the TFT substrate 1. Consequently, the total panel thickness TP can be further reduced.

In the case where the driving method for the liquid crystal display panel is of a lateral electric field type called IPS (In Plane Switching), for example, a conductor film 203 for the prevention of electric charging may be provided on a back surface of the glass substrate 201 of the counter substrate 2, in other words, on the surface to which the upper polarizing plate 5 is affixed, as shown in FIG. 3B. In this case, the back surface of the glass substrate 201 in the counter substrate 2 cannot be subjected to polishing for the reduction of thickness. When the conductor film 203 is thus formed on the counter substrate, as shown in FIG. 3B, a back surface of the glass substrate 101 in the TFT substrate, in other words, the surface to which the lower polarizing plate 4 is affixed, is ground to make the thickness T1 of the glass substrate 101 in the TFT substrate 1 smaller than the thickness T2 of the glass substrate 201 in the counter substrate 2, whereby the total panel thickness TP can be reduced.

Further, it is preferable that the surface hardness of the resin film 6 be harder than that of the upper polarizing plate 5. More specifically, it is preferable for the resin film 6 to have a surface pencil hardness of 3H or harder. The surface pencil hardness is meant a hardness with which the material surface is damaged when a line is drawn on the material surface with a pencil. That is, the surface pencil hardness of 3H means that the material surface is not damaged when a line is drawn on the resin film 6 with a pencil having a hardness of 3H or softer.

To make the resin film 6 with a surface pencil hardness of 3H or harder, there may be used a film obtained by forming a material having a pencil hardness of 3H or harder into a film shape, or there may be adopted a method wherein a material having an arbitrary pencil hardness is formed into a film and then the surface of the film is subjected to a hard coating treatment so as to give a surface pencil hardness of 3H or harder. In the case of using an acrylic resin or epoxy resin as the material of the resin film 6, the resin surface is subjected to a hard coating treatment as in the latter method just referred to above to give a surface pencil hardness of 3H or harder.

FIGS. 4 to 7 are schematic diagrams for explaining an example and functional effects of a hand-held electronic device for which the use of the liquid crystal display panel of the first embodiment is preferred.

Figure 5:
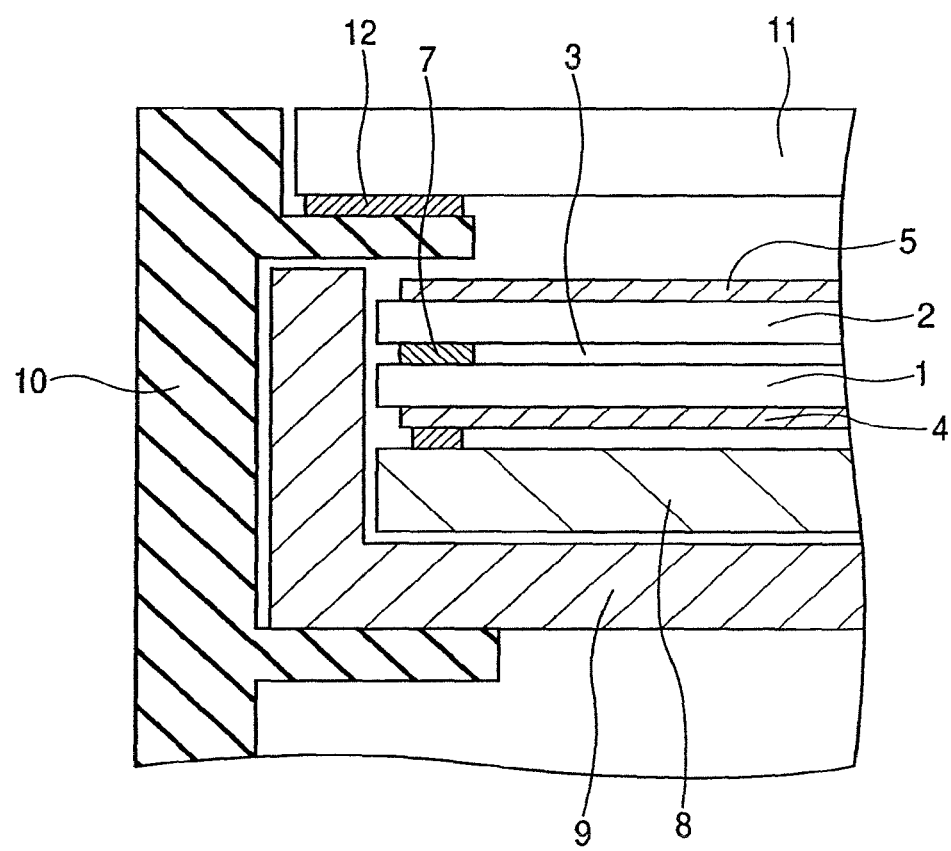
FIG. 5 is a sectional view taken along the line B-B' of FIG. 4.
Figure 6:
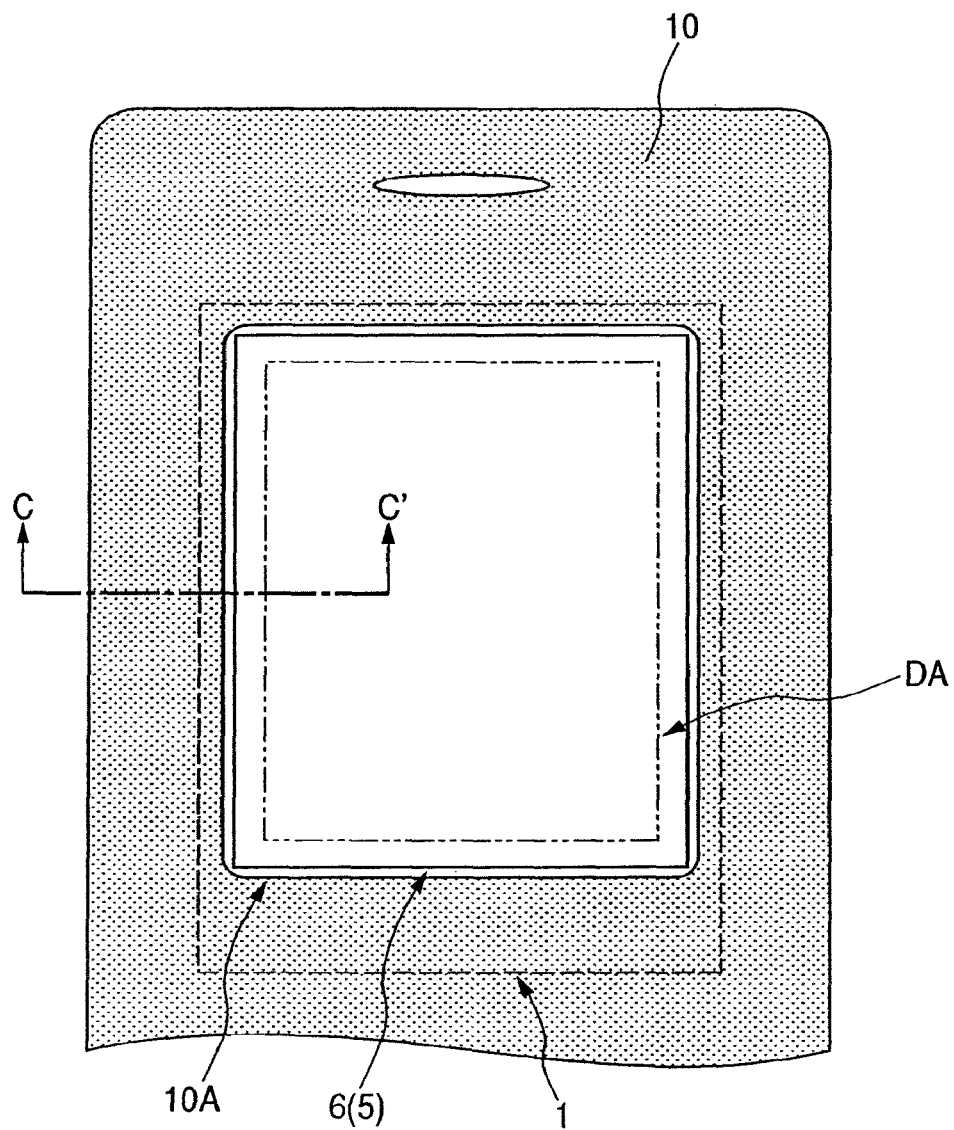
FIG. 6 is a schematic front view showing a schematic configuration of a display unit of a mobile telephone terminal using the liquid crystal display panel of the first embodiment.
Figure 7:
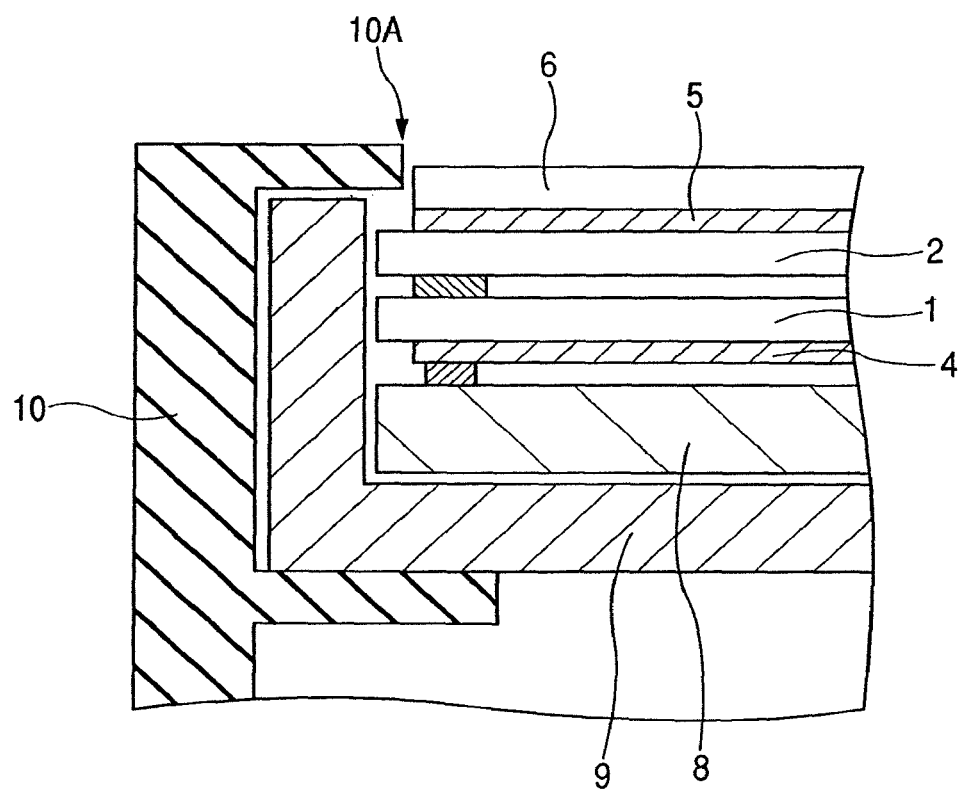
FIG. 7 is a sectional view taken along the line C-C' of FIG. 6.

FIG. 4 is a schematic front view showing a schematic configuration of a display unit of a conventional mobile telephone terminal, FIG. 5 is a sectional view taken along the line B-B' of FIG. 4, FIG. 6 is a schematic front view showing a schematic configuration of a display unit of a mobile telephone terminal using the liquid crystal display panel of the first embodiment, and FIG. 7 is a sectional view taken along the line C-C' of FIG. 6.

The liquid crystal display panel of the first embodiment is a display panel which is preferably applied to a display of a hand-held electronic device such as, for example, a mobile telephone terminal.

The liquid crystal display used in the display unit of the mobile telephone terminal includes, in addition to the liquid crystal display panel, a data driver which outputs a video signal to a video signal line (drain line) in the liquid crystal display panel, a gate driver which outputs a scanning signal to a scanning signal line (gate line) in the liquid crystal display panel, and a timing controller for controlling the timing at which the video signal and the scanning signal are to be outputted. In the case of a transmission type or semi-transmission type liquid crystal display, the liquid crystal display has a back light (light source). These parts are held integrally by a frame member called a display mold for example.

A liquid crystal display panel used in a conventional mobile telephone terminal includes, for example as shown in FIGS. 4 and 5, a TFT substrate 1, a counter substrate 2, a lower polarizing plate 4, an upper polarizing plate 5, and a sealing member 7. When the liquid crystal display panel is seen by the observer, the upper polarizing plate 5, counter substrate 2, liquid crystal material 3, TFT substrate 1 and lower polarizing plate 4 are disposed in this order from the observer. If the liquid crystal display concerned is a transmission type display, a back light 8 is disposed further behind the lower polarizing plate 4 when seen from the observer side. The liquid crystal display panel and the back light 8 are held by a concave display mold 9 so that a back surface side of the back light 8 is a bottom surface.

Such a liquid crystal display is accommodated within a sheath (case) 10 having an opening of the mobile telephone terminal so that a display area DA of the liquid crystal display panel can be seen. In the conventional mobile telephone terminal, a transparent protective cover 11 constituted by an acrylic plate or the like is usually disposed at a position closer to the observer compared with the liquid crystal display panel. In many cases, the protective cover 11 is fitted in a depression formed in the surface of the sheath 10 and is affixed to the sheath 10 through a pressure-sensitive adhesive 12. For example, the protective cover 11 functions to prevent the surface (upper polarizing plate 5) of the liquid crystal display panel from being damaged or prevent the liquid crystal display panel from being cracked upon exertion of pressure on the liquid crystal display panel.

In the conventional mobile telephone terminal using the liquid crystal display, it is necessary to use the protective cover 11 for protecting the liquid crystal display panel. Thus, the thickness of the display unit is increased.

On the other hand, in the liquid crystal display panel of the first embodiment, the resin film 6 is affixed to the upper polarizing plate 5 to enhance the strength of the liquid crystal display panel, and the resin film 6 with a surface pencil hardness of 3H or harder makes it difficult to damage the surface of the resin film 6. That is, in the liquid crystal display panel of the first embodiment, the resin film 6 is endowed with the function of the conventional protective cover 11. Therefore, for example as shown in FIGS. 6 and 7, if the liquid crystal display wherein the liquid crystal display panel is disposed so that the resin film 6 is positioned closest to the observer is accommodated inside the sheath 10 of the liquid crystal display, the liquid crystal display panel can be protected from being damaged and cracked due to pressure even in the absence of the protective cover 11. As a result, the display unit of the mobile telephone terminal can be made thinner than the conventional counterpart.

In the display unit of the conventional mobile telephone terminal there is an air layer between the liquid crystal display panel and the protective cover 11, but the air layer can be eliminated by using the liquid crystal display panel of the first embodiment. Consequently, the display efficiency can also be improved over conventional displays.

In the liquid crystal display panel of the first embodiment, the TFT substrate and the counter substrate 2 can be fabricated using glass substrates 101 and 201. Therefore, the multiple wiring layers 102 and 202 can be formed more easily than in the liquid crystal display panel using plastic substrates which is described in Patent Document 1. Besides, by forming the TFT substrate 1 and the counter substrate 2 with use of the glass substrates 101 and 201, it is also possible to prevent the occurrence of unevenness in display caused by a change in environment.

Figure 8A:
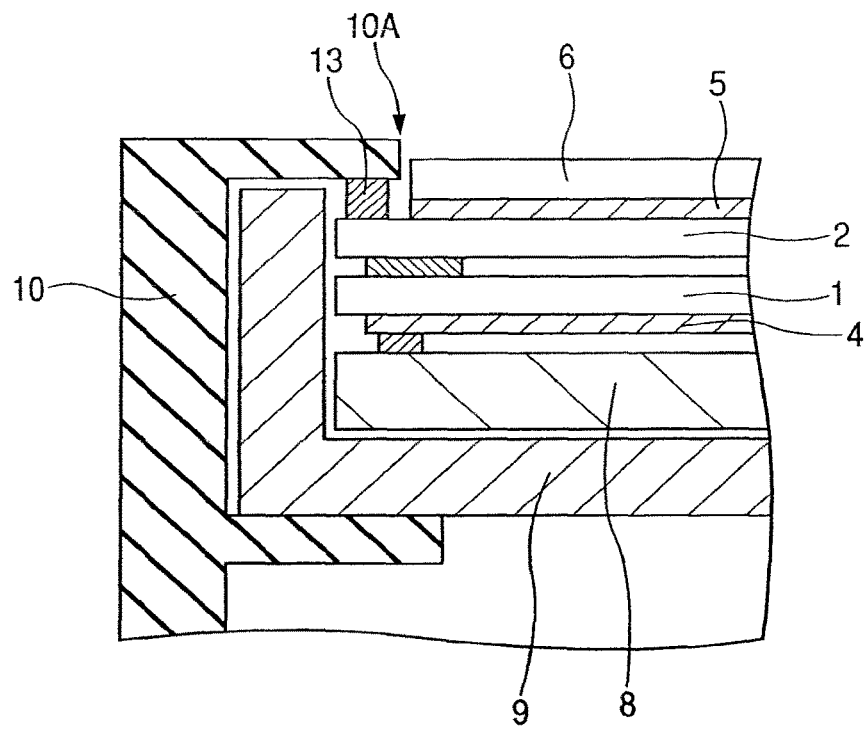
FIGS. 8A and 8B are schematic sectional views showing modified configurations of the display unit of the mobile telephone terminal using the liquid crystal display panel of the first embodiment.
Figure 8B:
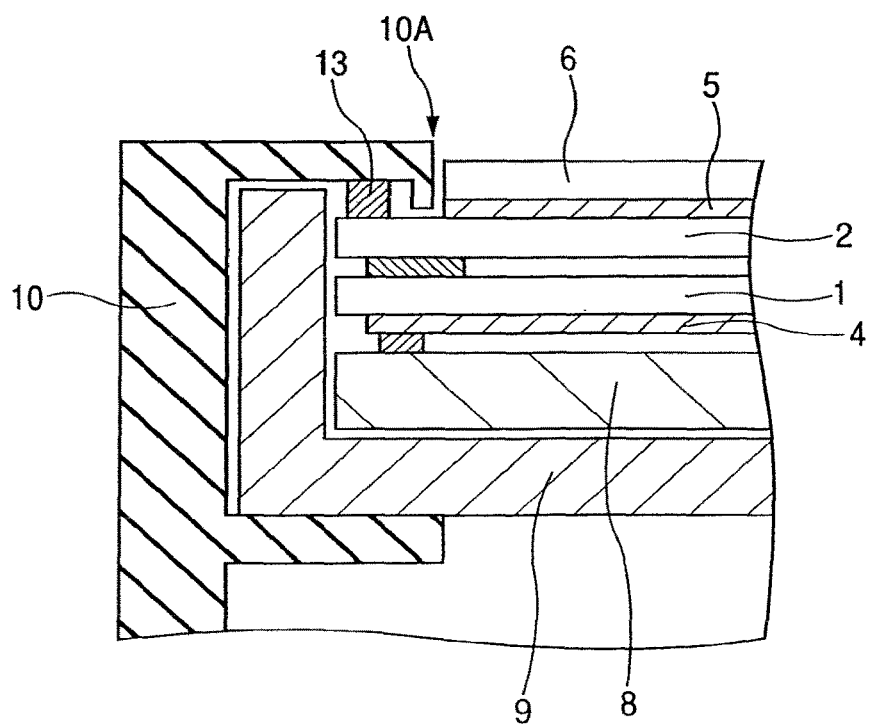

FIGS. 8A and 8B is schematic sectional views showing modified configurations of the display unit of the mobile telephone terminal using the liquid crystal display panel of the first embodiment. In FIG. 8, as such modified configurations, there are shown two sectional views which are FIG. 8A and FIG. 8B. These two sectional views correspond to the sectional configuration taken along the line C-C' of FIG. 6.

When the liquid crystal display having the liquid crystal panel of the first embodiment is applied to a mobile telephone terminal, it is not necessary to affix the protective cover 11 to the surface of the sheath 10, as shown in FIG. 7. However, when the liquid crystal display is accommodated in such a state as shown in FIG. 7, water or the like is apt to get into the inside of the sheath through a gap formed between an outer periphery 10A of the opening area of the sheath 10 and the liquid crystal display panel (resin film 6). As a result, wiring formed on the TFT substrate 1 of the liquid crystal display panel and wiring formed on another circuit board are apt to be corroded.

Therefore, in the case of using the liquid crystal display panel of the first embodiment, for example as shown in FIG. 8A, it is preferable that the outline of both upper polarizing plate 5 and resin film 6 affixed to the counter substrate 2 be made smaller than that of the lower polarizing plate 4 and that the counter substrate 2 and the sheath 10 be fixed together by bonding with use of a pressure-sensitive adhesive 13. In this case, if the pressure-sensitive adhesive 13 is formed in an annular shape which surrounds the upper polarizing plate 5 and the resin film 6, the pressure-sensitive adhesive 13 serves as a wall and it is possible to prevent the entry of water or the like into the inside of the sheath. Of course, an adhesive may be used instead of the pressure-sensitive adhesive 13.

For example as shown in FIG. 8B, if a projecting portion projecting toward the counter substrate 2 is formed on the outer periphery 10A of the opening area of the sheath 10, the effect of preventing the entry of water or the line to the inside of the sheath is further enhanced.

Figure 9:
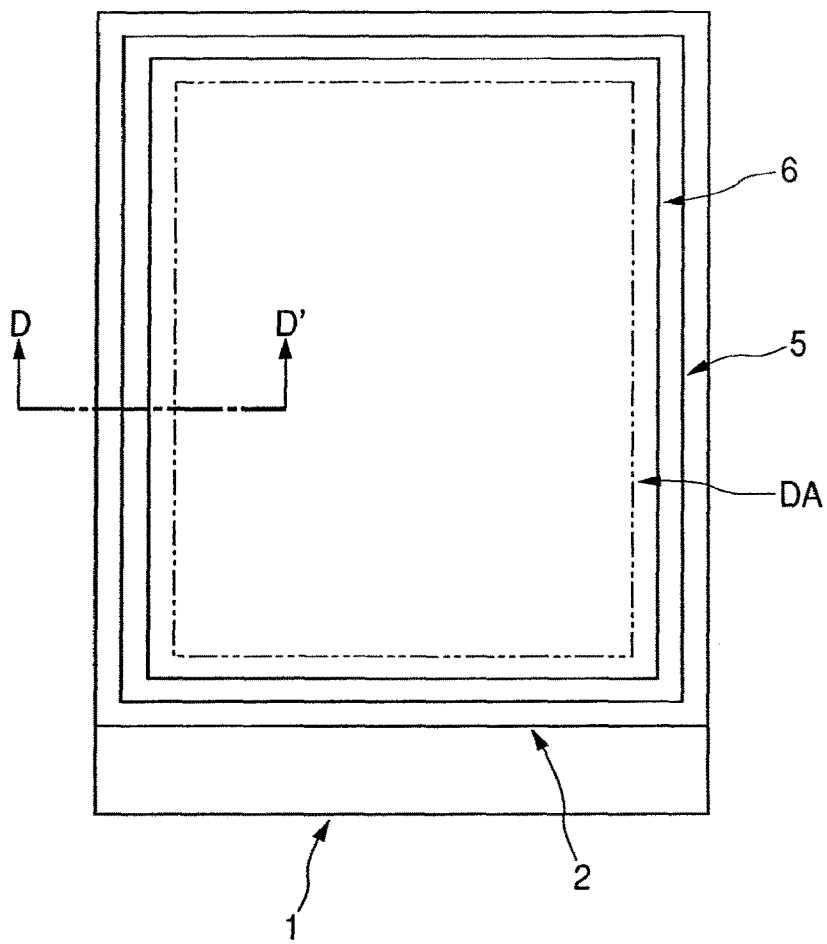
FIG. 9 is a schematic front view for explaining an application example of the liquid crystal display panel of the first embodiment.
Figure 10:
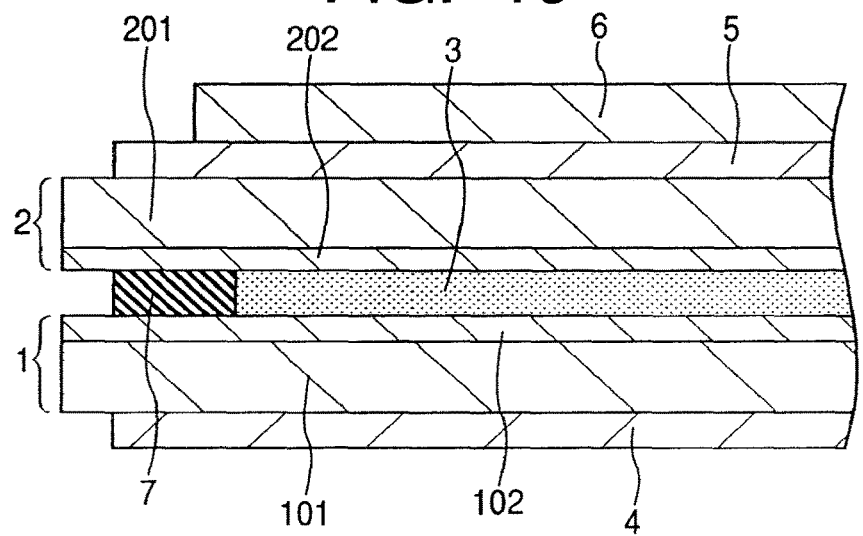
FIG. 10 is a sectional view taken along the line D-D' of FIG. 9.

FIG. 9 is a schematic front view for explaining an application of the liquid crystal display panel of the first embodiment and FIG. 10 is a sectional view taken along the line D-D' of FIG. 9.

In the liquid crystal display panel of the first embodiment, both reduction in thickness of the panel and ensuring of a sufficient strength thereof are attained by affixing the resin film 6 to the upper polarizing plate 5 affixed to the counter substrate 2. Further, by using such a liquid crystal display panel it is made possible to reduce the thickness of a hand-held electronic device such as a mobile telephone terminal.

However, in the case where the outer periphery of the upper polarizing plate 5 and that of the resin film 6 are coincident with each other when seen from the front side for example as is the case with the liquid crystal display panel shown in FIGS. 1 and 2, the outer periphery end face of the upper polarizing plate 5 comes into contact with the outside air for example as shown in FIG. 7 and FIGS. 8A and 8B. Consequently, the upper polarizing plate 5 is corroded and deteriorated due to moisture contained in the outside air and there is a possibility that the upper polarizing plate 5 may be peeled off from the counter substrate 2 or unevenness in display may result.

The occurrence of such a problem can be prevented by diminishing the outline of the resin film 6 so that the outer periphery of the resin film 6 lies inside the outer periphery of the upper polarizing plate 5 when the liquid crystal display panel is viewed from the front side for example as shown in FIGS. 9 and 10. Of course, the outline of the resin film 6 should be diminished in such a manner that the outer periphery thereof lies outside the display area DA.

Figure 11A:
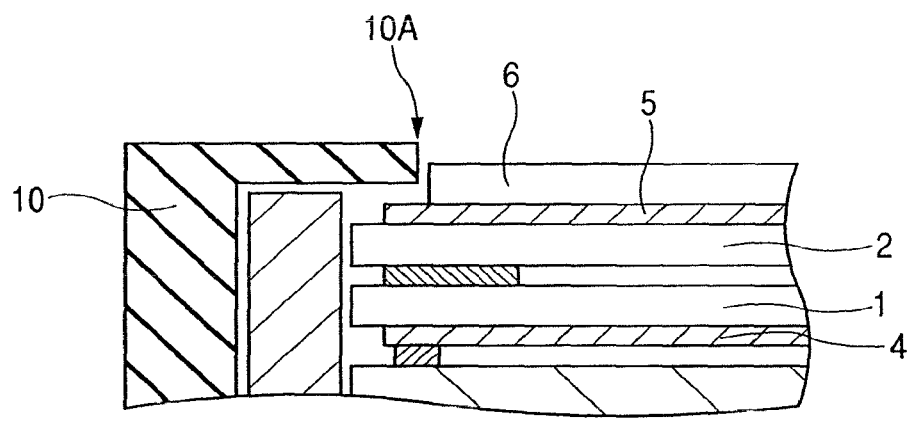
FIGS. 11A to 11C are schematic sectional views showing structural examples of a display unit of a mobile telephone terminal using the liquid crystal display panel shown in FIGS. 9 and 10.
Figure 11B:
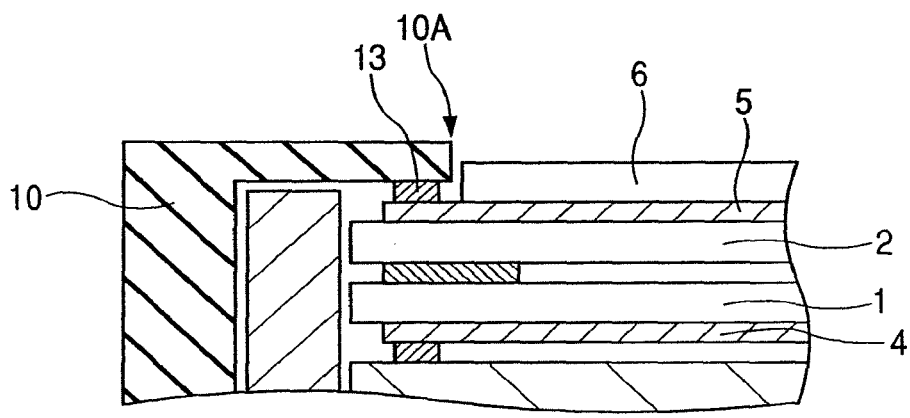
Figure 11C:
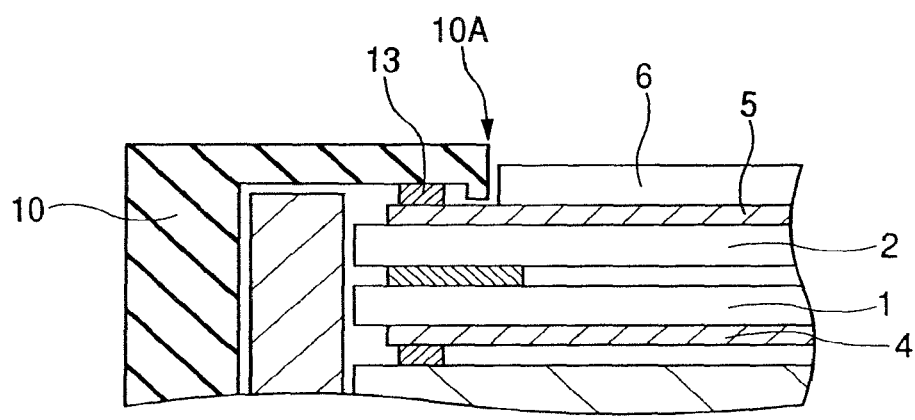

FIGS. 11A to 11C are schematic sectional views showing structural examples of a display unit of a mobile telephone terminal using the liquid crystal display panel shown in FIGS. 9 and 10. In FIG. 11, there are shown three sectional views 11A, 11B and 11C as structural examples, which sectional views correspond to the sectional configuration taken along the line C-C' of FIG. 6.

Also in the case where the liquid crystal display having the liquid crystal display panel shown in FIGS. 9 and 10 is applied to a mobile telephone terminal, it is not necessary to affix the protective cover 11 to the surface of the sheath 10 for example as shown in FIG. 11A. Consequently, the display unit of the mobile telephone terminal can be made thinner than the conventional counterpart.

Besides, since the outer periphery of the resin film 6 in the liquid crystal display panel lies inside the outer periphery of the upper polarizing plate 5, the outer periphery 10A of the opening area of the sheath 10 can be positioned inside the outer periphery of the upper polarizing plate 5. Therefore, for example in comparison with the case of FIG. 7, the path from the outside of the sheath 10 up to a side face of the outer periphery of the upper polarizing plate 5 becomes long and complicated and the entry of moisture, etc. becomes difficult. As a result, the side face of the outer periphery of the upper polarizing plate 5 becomes difficult to be corroded and deteriorated and it is possible to diminish the possibility of the upper polarizing plate 5 being peeled off from the counter substrate 2 or causing unevenness in display.

For example as shown in FIG. 11B, it is preferable that the upper polarizing plate 5 and the sheath 10 be bonded and fixed together using a pressure-sensitive adhesive 13. In this case, if the shape of the pressure-sensitive adhesive 13 is made an annular shape which surrounds the resin film 6, the pressure-sensitive adhesive 13 serves as a wall and it is thereby possible to prevent the entry of moisture, etc. into inside of the sheath. As a result, the side face of the outer periphery of the upper polarizing plate 5 becomes more difficult to be deteriorated and it is possible to further diminish the possibility of the upper polarizing plate 5 being peeled off from the counter substrate 2 or causing unevenness in display.

Moreover, for example as shown in FIG. 11C, if the outer periphery 10A of the opening area of the sheath 10 is formed with a projecting portion projecting toward the upper polarizing plate 5, the effect of preventing the entry of moisture, etc. into the inside of the sheath is more enhanced.

According to the liquid crystal display panel of the first embodiment, as set forth above, a required strength of the liquid crystal display panel can be ensured by affixing the resin film 6 in contact with the upper polarizing plate 5. As a result, the thickness of the glass substrate 10 in the TFT substrate 1 and that of the glass substrate 201 in the counter substrate 2 can be reduced by polishing. Consequently, it is possible to reduce the thickness of the liquid crystal display panel. That is, in the liquid crystal display panel of the first embodiment it is possible to attain both reduction of thickness and ensuring of a sufficient strength.

Further, since the TFT substrate 1 and the counter substrate 2 can each be formed using a glass substrate, there is little difference in the amount of deformation caused by an environmental change. Therefore, it is also possible to prevent the occurrence of unevenness in display caused by an environmental change.

Additionally, by applying the liquid crystal display (module) having the liquid crystal display panel of the first embodiment to a hand-held electronic device such as a mobile telephone terminal it is possible to reduce the thickness of a display unit of the hand-held electronic device.

In the first embodiment, a reference is made to an example in which the surface pencil hardness of the resin film 6 is set to 3H or harder, whereby for example the use of the conventional protective cover 11 is made unnecessary when installing the liquid crystal display into the mobile telephone terminal and the thickness of the display unit is thereby reduced. However, the application of the liquid crystal display panel of the first embodiment is not limited to such an example. For example, it goes without saying that the liquid crystal display panel of the first embodiment may be installed into a mobile telephone terminal using the protective cover 11. In the case of using the protective cover 11, the surface pencil hardness of the resin film 6 may be 3H or softer. In this case, however, it is preferable the total thickness TP of the liquid crystal display panel including the resin film 6 be set to a value of 1.3 mm or less.

Second Embodiment

Figure 12:
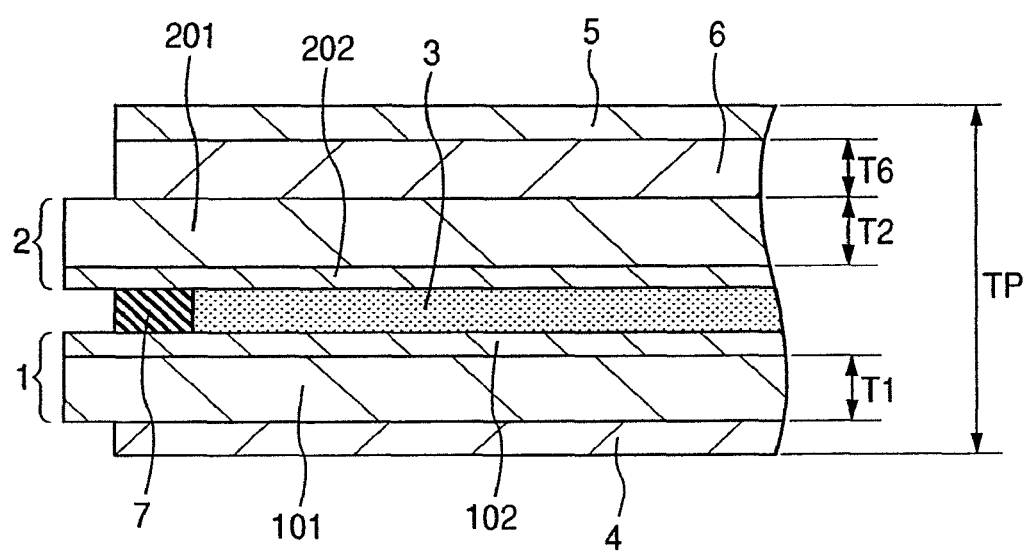
FIG. 12 is a schematic sectional view showing a schematic configuration of a liquid crystal display panel according to a second embodiment of the present invention.

FIG. 12 is a schematic sectional view showing a schematic configuration of a liquid crystal display panel according to a second embodiment of the present invention. The sectional view of FIG. 12 corresponds to the sectional configuration taken along the line A-A' of FIG. 1.

The liquid crystal display panel of the second embodiment is basically of the same configuration as the liquid crystal display panel of the first embodiment. In the second embodiment, therefore, a description will be given below about only the difference from the first embodiment.

For example as shown in FIG. 12, the liquid crystal display panel of the second embodiment includes a TFT substrate 1, a counter substrate 2, a liquid crystal material 3 held between the TFT substrate 1 and the counter substrate 2, a pair of polarizing plates (a lower polarizing plate 4 and an upper polarizing plate 5) disposed between the TFT substrate 1 and the counter substrate 2 both holding the liquid crystal material 3, and a resin film 6 disposed on the counter substrate 2 side.

Also in the liquid crystal display panel of the second embodiment, though not shown, a phase difference plate may be disposed between a glass substrate 101 in the TFT substrate 1 and the lower polarizing plate 4 and also between a glass substrate 201 in the counter substrate 2 and the upper polarizing plate 5.

In this case, unlike the first embodiment, the resin film 6 is disposed between the counter substrate 2 and the upper polarizing plate 5. For example, the resin film 6 is affixed in contact with the glass substrate 201 in the counter substrate 2 through a pressure-sensitive adhesive or the like. Further, the upper polarizing plate 5 is affixed in contact with the resin film 6 through a pressure-sensitive adhesive for example.

Also in the liquid crystal display panel of the second embodiment it is preferable that a film of a high light transmittance, especially a colorless, transparent film, be used as the resin film 6. In the liquid crystal panel of the second embodiment the resin film 6 is disposed between the upper polarizing plate 5 and the counter substrate 2 (lower polarizing plate 4). Therefore, it is preferable for the resin film 6 to be low, more preferably nearly zero, in optical anisotropy. Therefore, it is preferable to use an epoxy resin as the material of the resin film 6. However, in the case where the optical anisotropy is of an allowable magnitude or can be compensated, an acrylic resin for example may be used as the material of the resin film 6.

In the liquid crystal display panel of the second embodiment, the upper polarizing plate 5 is disposed on the observer side (front side) with respect to the resin film 6. Therefore, in the second embodiment, unlike the first embodiment, it is not necessary to set the surface pencil hardness of the resin film 6 to 3H or harder. Instead, in the liquid crystal display panel of the second embodiment, the surface pencil hardness of the upper polarizing plate 5 positioned closest to the observer is made 3H or harder. This can be done for example by applying a hard coating treatment to the surface of a conventional polarizing plate.

Also in the liquid crystal display panel of the second embodiment it is preferable that the thickness T6 of the resin film 6 be set to a value of 0.2 mm or more and 1.0 mm or less. If the thickness T6 of the resin film 6 is not smaller than 0.2 mm, it is possible to ensure a sufficient strength of the liquid crystal display panel even if the glass substrate 101 in the TFT substrate 1 and the glass substrate 201 in the counter substrate 2 are made as thin as 0.5 mm or less. In the liquid crystal display panel of the second embodiment, therefore, it is possible to ensure a sufficient strength even if the total panel thickness TP is made 2 mm or less. In the liquid crystal display panel of the second embodiment it is preferable that the total panel thickness TP be 2 mm or less and that the panel thickness TP-T6 exclusive of the resin film be 1.3 mm or less.

The resin film 6 also functions as a reinforcing member for the liquid crystal display panel and therefore, as in the configuration shown in FIG. 3A, the thickness T2 of the glass substrate 201 in the counter substrate 2 with the resin film 6 affixed thereto can be made smaller than the thickness T1 of the glass substrate 101 in the TFT substrate 1. Consequently, the total panel thickness TP can be further reduced.

When the liquid crystal display panel is of the lateral electric field driving type called IPS, for example as in the configuration shown in FIG. 3B, there sometimes is a case where a conductor film 203 for the prevention of electric charging is provided on the back surface of the glass substrate 201 in the counter substrate 2, in other words, the surface with the upper polarizing plate 5 affixed thereto. In this case, the glass substrate 201 in the counter substrate 2 cannot be subjected to polishing for the reduction of thickness. Therefore, when the conductor film 203 is provided on the counter substrate 2, for example as in the configuration shown in FIG. 3B, the back surface of the glass substrate 101 in the TFT substrate, in other words, the surface with the lower polarizing plate 4 affixed thereto, is subjected to polishing to make the thickness T1 of the glass substrate 101 in the TFT substrate 1 smaller than the thickness T2 of the glass substrate 201 in the counter substrate 2, whereby the total panel thickness TP can be reduced.

Figure 13A:
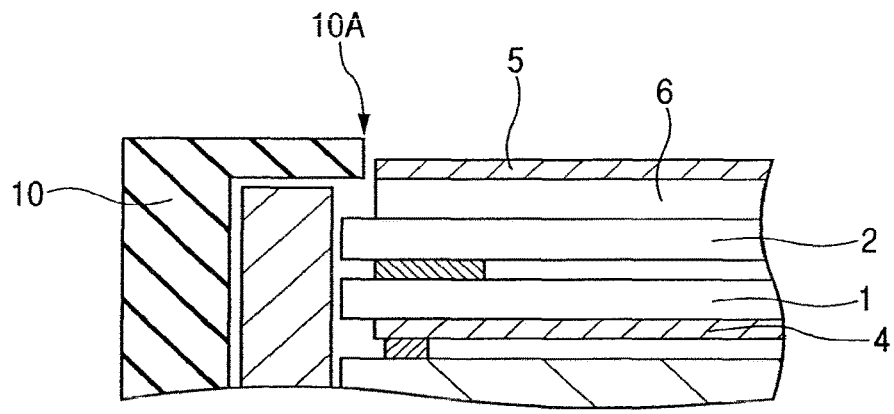
FIGS. 13A to 13C are schematic sectional views showing structural examples of a display unit of a mobile telephone terminal using the liquid crystal display panel of the second embodiment.
Figure 13B:
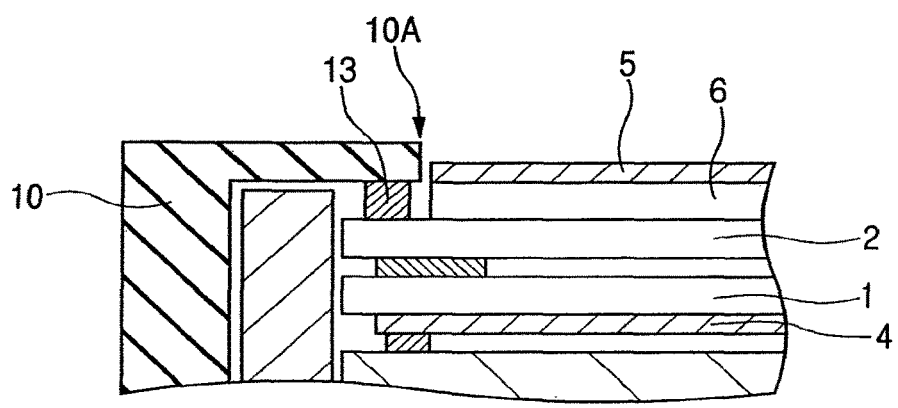
Figure 13C:
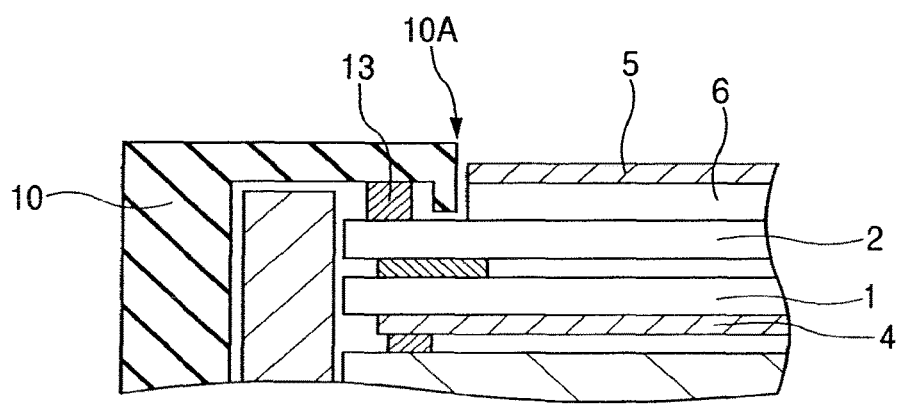

FIGS. 13A to 13C are schematic sectional views showing structural examples of a display unit of a mobile telephone terminal using the liquid crystal display panel of the second embodiment. In FIG. 13 there are shown three sectional views 13A, 13B and 13C as structural examples, which correspond to the sectional configuration taken along the line C-C' of FIG. 6.

Also in the case of applying the liquid crystal display having the liquid crystal display panel of the second embodiment to a mobile telephone terminal, it is not necessary to affix the protective cover 11 to the surface of a sheath 10 for example as shown in FIG. 13A. Consequently, the display unit of the mobile telephone terminal can be made thinner than the conventional counterpart.

However, when the liquid crystal display is accommodated inside the sheath 10 in such a state as shown in FIG. 13A, moisture or the like is apt to get into the inside of the sheath 10 through a gap formed between an outer periphery 10A of the opening area of the sheath 10 and the liquid crystal display panel (upper polarizing plate 5), so that wiring formed in the TFT substrate 1 of the liquid crystal display panel and wiring formed in another circuit board are apt to be corroded.

Therefore, also in the case of using the liquid crystal display panel of the second embodiment, for example as shown in FIG. 13B, it is preferable that the outline of the upper polarizing plate 5 and the resin film 6 both affixed to the counter substrate 2 be made smaller than that of the lower polarizing plate 4 and that the counter substrate 2 and the sheath be bonded and fixed together through a pressure-sensitive adhesive 13. In this case, if the pressure-sensitive adhesive 13 is formed in an annular shape which surrounds the upper polarizing plate 5 and the resin film 6, the pressure-sensitive adhesive 13 serves as a wall, whereby the entry of moisture, etc. into the inside of the sheath can be prevented.

Moreover, for example as shown in FIG. 13C, if the outer periphery 10A of the opening area of the sheath 10 is formed with a projecting portion projecting toward the counter substrate 2, the effect of preventing the entry of moisture, etc. into the inside of the sheath is further enhanced.

Figure 14:
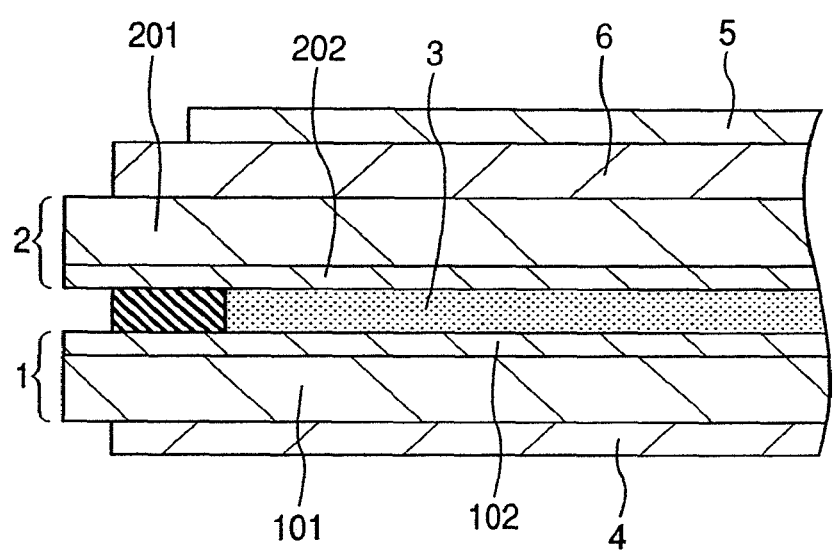
FIG. 14 is a schematic sectional view for explaining an application example of the liquid crystal display panel of the second embodiment.

FIG. 14 is a schematic sectional view for explaining an application of the liquid crystal display panel of the second embodiment, which corresponds to the sectional configuration taken along the line D-D' of FIG. 9.

Also in the liquid crystal display panel of the second embodiment, the resin film 6 and the upper polarizing plate 5 are both affixed to the glass substrate 201 of the counter substrate 2, and the outline of the upper polarizing plate 5 may be made small so that the outer periphery thereof lies inside the outer periphery of the resin film 6, as shown in FIG. 14. In this case, it goes without saying that the outer periphery of the upper polarizing plate 5 should lie outside the display area DA.

Figure 15A:
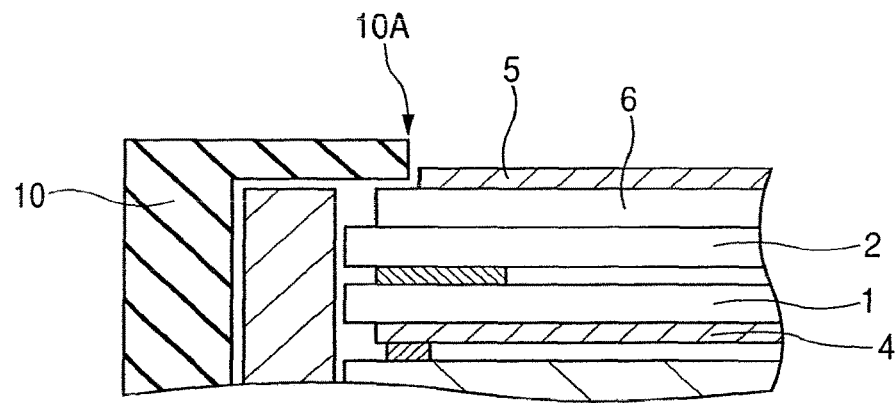
FIGS. 15A to 15C are schematic sectional views showing structural examples of a display unit of a mobile telephone terminal using the liquid crystal display panel shown in FIG. 14.
Figure 15B:
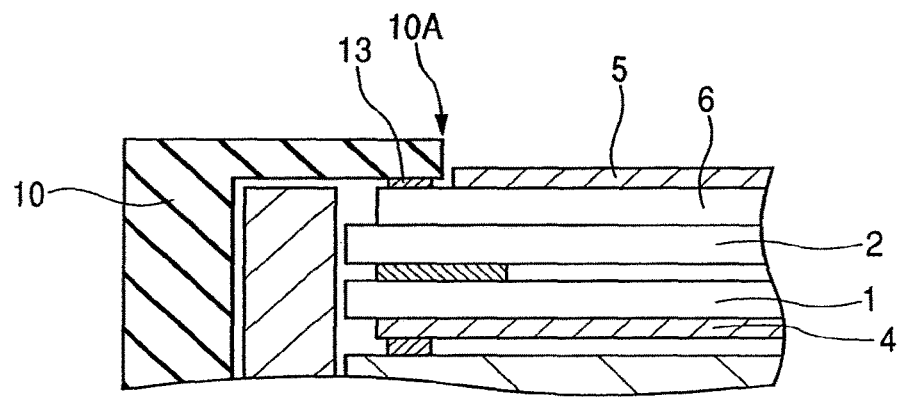
Figure 15C:
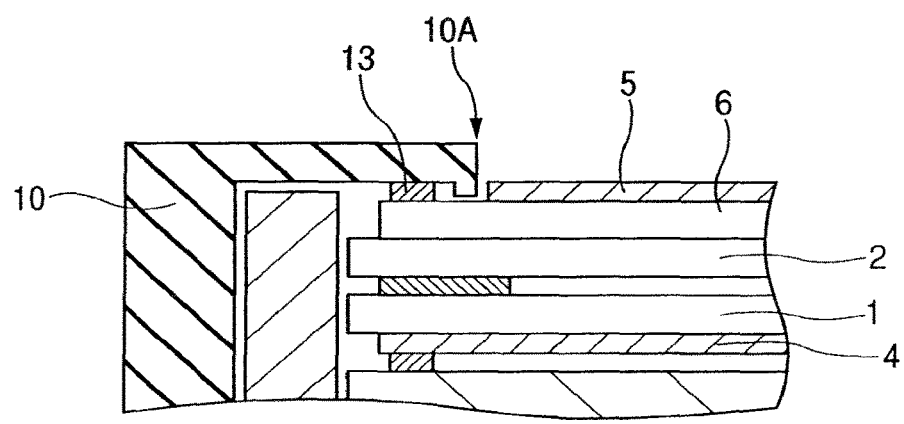

FIGS. 15A to 15C are schematic sectional views showing structural examples of a display unit of a mobile telephone terminal using the liquid crystal display panel shown in FIG. 14. In FIG. 15, there are shown three sectional views 15A, 15B and 15C as structural examples, which correspond to the sectional configuration taken along the line C-C' of FIG. 6.

Also in the case of applying the liquid crystal display using the liquid crystal display panel shown in FIG. 14 to a mobile telephone terminal, for example as shown in FIG. 15A, it is not necessary to affix the protective cover 11 to the surface of the sheath 10, whereby the display unit of the mobile telephone terminal can be made thinner than the conventional counterpart.

Moreover, since the outer periphery of the upper polarizing plate 5 of the liquid crystal display panel lies inside the outer periphery of the resin film 6, the outer periphery 10A of the opening area of the sheath 10 can be positioned inside the outer periphery of the resin film 6. Consequently, for example in comparison with the case of FIG. 13A, the path from the outside of the sheath 10 to the inside thereof becomes long and complicated, making the entry of moisture, etc. difficult.

In this case, it is preferable that the resin film and the sheath 10 be bonded and fixed together using the pressure-sensitive adhesive 13, for example as shown in FIG. 15B. If the pressure-sensitive adhesive 13 is formed for example in an annular shape which surrounds the upper polarizing plate, the pressure-sensitive adhesive 13 serves as a wall, whereby it is possible to prevent the entry of moisture, etc. into the inside of the sheath.

Further, for example as shown in FIG. 15C, if the outer periphery 10A of the opening area of the outer sheath 10 is formed with a projecting portion projecting toward the resin film 6, the effect of preventing the entry of moisture, etc. into the inside of the sheath is further enhanced.

According to the liquid crystal display panel of the second embodiment, since the resin film 6 is disposed between and in close contact with the glass substrate 101 in the TFT substrate 1 and the glass substrate 201 in the counter substrate 2, it is possible to ensure a required strength of the liquid crystal display panel. As a result, both glass substrates 101 and 201 can be reduced in thickness by polishing and hence it is possible to reduce the thickness of the liquid crystal display panel. That is, also in the liquid crystal display panel of the second embodiment it is possible to attain both reduction of thickness and ensuring of a sufficient strength.

Further, since the TFT substrate 1 and the counter substrate 2 can be formed using glass substrates, there is little difference in the amount of deformation caused by an environmental change. Consequently, it is also possible to prevent the occurrence of unevenness in display caused by an environmental change.

Additionally, the display unit of a hand-held electronic device such as a mobile telephone terminal can be made thin by applying the liquid crystal display (module) having the liquid crystal display panel of the second embodiment to the hand-held electronic device.

In the second embodiment reference is made to an example in which the surface pencil hardness of the upper polarizing plate 5 is made 3H or harder, thereby making the use of the conventional protective cover 11 unnecessary when installing the liquid crystal display into the mobile telephone terminal to attain the reduction in thickness of the display unit. However, it goes without saying that the application of the liquid crystal display panel of the second embodiment is not limited to this example, and the liquid crystal display panel may be installed into a mobile telephone terminal using the protective cover 11. In the case of using the protective cover 11, the surface pencil hardness of the upper polarizing plate 5 may be 3H or softer. In this case, however, it is preferable that the total thickness TP of the liquid crystal display panel including the resin film 6 be set to a value of 1.3 mm or less.

Third Embodiment

Figure 16:
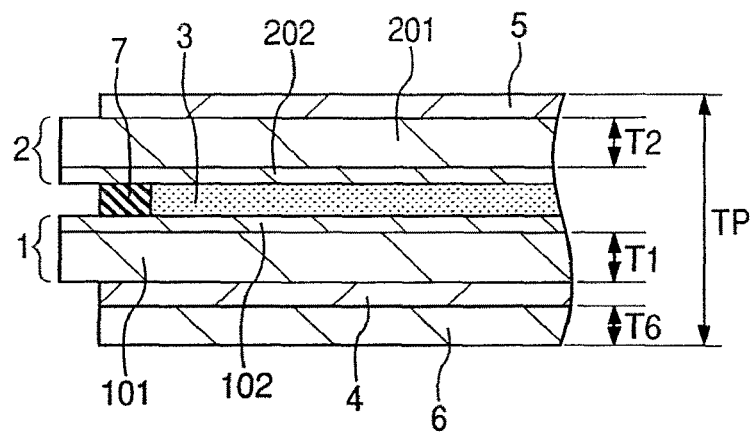
FIG. 16 is a schematic sectional view showing a schematic configuration of a liquid crystal display panel according to a third embodiment of the present invention.

FIG. 16 is a schematic sectional view showing a schematic configuration of a liquid crystal display panel according to a third embodiment of the present invention.

The liquid crystal display panel of the third embodiment is basically of the same configuration as the liquid crystal display panel of the first embodiment. In the third embodiment, therefore, a description will be given only about points different from the first embodiment.

For example as shown in FIG. 16, the liquid crystal display panel of the third embodiment includes a TFT substrate 1, a counter substrate 2, a liquid crystal material 3 held between the TFT substrate and the counter substrate 2, a pair of polarizing plates (a lower polarizing plate 4 and an upper polarizing plate 5) disposed between the TFT substrate 1 and the counter substrate 2 both holding the liquid crystal material 3, and a resin film 6 affixed in contact with the lower polarizing plate 4 located on the TFT substrate 1 side.

That is, in the liquid crystal display panel of the third embodiment, unlike the first embodiment, the resin film 6 is disposed lies on the back surface side of the TFT substrate 1 and is most distant from the observer. The resin film 6 is affixed in contact with the lower polarizing plate 4 with use of a pressure-sensitive adhesive for example.

Also in the liquid crystal display panel of the third embodiment, though not shown, a phase difference plate may be disposed between a glass substrate 101 in the TFT substrate and the lower polarizing plate 4 and also between a glass substrate 201 of the counter substrate 2 and the upper polarizing plate 5.

Also in the liquid crystal display panel of the third embodiment it is preferable that a film of a high light transmittance, especially a colorless, transparent film, be used as the resin film 6. For example, an acrylic resin or an epoxy resin may be used as the resin film 6.

In the liquid crystal display panel of the third embodiment, the lower polarizing plate 4 and the TFT substrate 1 are disposed more closely to (in front of) the observer with respect to the resin film 6. Therefore, also in the third embodiment, unlike the liquid crystal display panel of the first embodiment, it is not necessary to set the surface pencil hardness of the resin film 6 to 3H or harder.

In the liquid crystal display panel of the third embodiment, for example, it is preferable that the total of the thickness T1 of the glass substrate 101 in the TFT substrate 1 and the thickness T2 of the glass substrate 201 in the counter substrate 2 be 0.5 mm or less. The thicknesses T1 and T2 of the glass substrates 101 and 201 may be approximately equal to each other, or either one of them may be thin and the other thick.

As a result, when a pressing force is exerted on the liquid crystal display panel from the upper polarizing plate 5 side, the force can be borne by the resin film 6 affixed to the back surface of the liquid crystal display panel. Therefore, even if the glass substrates 101 and 201 are made thin, it is possible to ensure a sufficient strength of the liquid crystal display panel.

Figure 17:
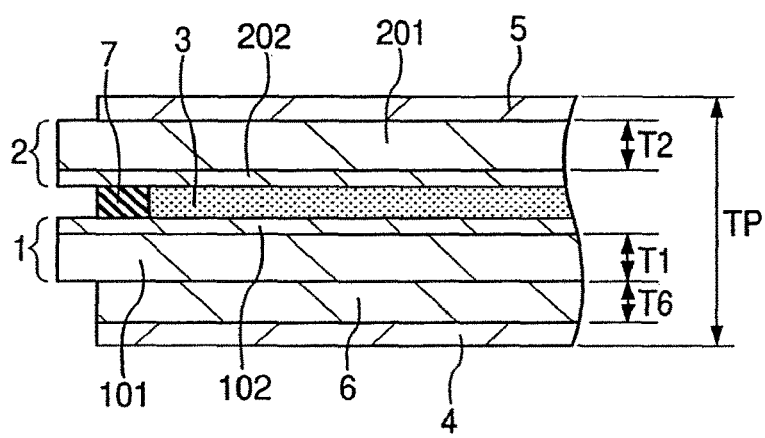
FIG. 17 is a schematic sectional view for explaining a modification of the liquid crystal display panel of the third embodiment.

FIG. 17 is a schematic sectional view for explaining a modified example of the liquid crystal display panel of the third embodiment.

In the case of disposing the resin film 6 on the TFT substrate 1 side as in the third embodiment, the disposed position may be between the glass substrate 101 in the TFT substrate 1 and the lower polarizing plate 4 as in FIG. 17. In the case of disposing the resin film 6 between the TFT substrate 1 and the lower polarizing plate 4, it is preferable that the resin film 6 be low, more preferably nearly zero, in optical anisotropy. Therefore, it is preferable to use, for example, an epoxy resin as the material of the resin film 6. However, if the optical anisotropy is of an allowable magnitude or can be compensated, for example an acrylic resin may be used as the material of the resin film 6.

Also in the liquid crystal display panel of the third embodiment it is preferable that the thickness T6 of the resin film 6 be set to 0.2 mm or more and 1.0 mm or less. If the thickness T6 of the resin film 6 is 0.2 mm or more, a sufficient strength of the liquid crystal display panel can be ensured even if the glass substrate 101 in the TFT substrate 1 and the glass substrate 201 in the counter substrate 2 are each made as thin as 0.5 mm or less. Thus, in the liquid crystal display panel of the third embodiment, a sufficient strength can be ensured even if the total panel thickness TP is set to 1.3 mm or less.

According to the liquid crystal display panel of the third embodiment, as set forth above, a required strength of the liquid crystal display panel can be ensured by disposing the resin film 6 in a contact manner on the back surface side of the lower polarizing plate 4 or between the glass substrate 101 in the TFT substrate 1 and the lower polarizing plate 4. Besides, since the required strength can be ensured by the resin film 6, the glass substrate 101 in the TFT substrate 1 and the glass substrate 201 in the counter substrate 2 can be reduced in thickness by polishing. Consequently, it is possible to reduce the thickness of the liquid crystal display panel. That is, also in the liquid crystal display panel of the third embodiment it is possible to attain both reduction of thickness and ensuring of a sufficient strength.

Moreover, since the TFT substrate 1 and the counter substrate 2 can be formed using glass substrates, there is little difference in the amount of deformation caused by an environmental change. Therefore, it is possible to prevent the occurrence of unevenness in display caused by an environmental change.

In the case of installing the liquid crystal display having the liquid crystal display panel of the third embodiment to, for example, a mobile telephone terminal, it is preferable, as in the conventional liquid crystal display, that a protective cover for protecting the liquid crystal display panel be affixed to a sheath 10 of the mobile telephone terminal. However, in the liquid crystal display having the liquid crystal display panel of the third embodiment, the total of the thickness T1 of the glass substrate 101 in the TFT substrate 1 and the thickness T2 of the glass substrate 201 in the counter substrate 2 is 0.5 mm or less and the thickness of the resin film is 0.1 mm or more and 0.3 mm or less. That is, in the liquid crystal display using the liquid crystal display panel of the third embodiment, the liquid crystal display panel is thinner than the conventional liquid crystal display panel and can be so much reduced in thickness. As a result, even if the protective cover for protecting the liquid crystal display panel is affixed to the sheath of the mobile telephone terminal, the display unit of the mobile telephone terminal can be made thinner than the conventional counterpart.

Although the present invention has been described concretely on the basis of the above embodiments, it goes without saying that the invention is not limited to the above embodiments, but that various changes may be made within the scope not departing from the gist of the invention.

For example, in each of the above embodiments, reference is made to a transmission type or semi-transmission type liquid crystal display panel as an example, which has two polarizing plates, i.e., the lower polarizing plate 2 and the upper polarizing plate 5. However, the present invention is applicable not only to such a transmission or semi-transmission type but also to a reflection type liquid crystal display panel.

Figure 18:
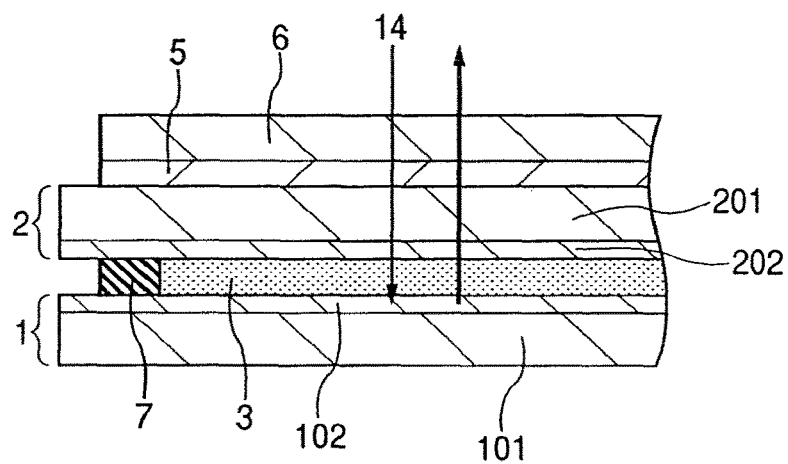
FIG. 18 is a schematic sectional view showing a schematic configuration of a reflection type liquid crystal display panel to which the present invention is applied.

FIG. 18 is a schematic sectional view showing a schematic configuration wherein the present invention is applied to a reflection type liquid crystal display panel.

For example as shown in FIG. 18, the reflection type liquid crystal display panel includes a TFT substrate 1, a counter substrate 2, a liquid crystal material 3 held between the TFT substrate and the counter substrate 2, and a polarizing plate 5 affixed to a glass substrate 201 in the counter substrate 2. In the case of applying the configuration of the first embodiment to this display panel, there is provided a resin film 6 affixed in contact with the polarizing plate 5 which is disposed on the counter substrate 2 side.

When the display having such a liquid crystal display panel is viewed from the observer side, the counter substrate 2 is usually disposed on the observer side with respect to the TFT substrate 1. That is, when the observer looks at the liquid crystal display panel shown in FIG. 18, the resin film 6, polarizing plate 5, counter substrate 2, liquid crystal material 3 and TFT substrate 1 are disposed in this order from the observer side.

In this case, for example a reflective layer is formed in a multi-thin film layer 102 of the TFT substrate 1 and light incident on the liquid crystal display panel from the resin film 6 side is reflected by the reflective layer in the multi-thin film layer 102 and is then emitted toward the observer.

Even in such a reflection type liquid crystal display panel, by affixing the resin film 6 formed of, for example, an acrylic resin or an epoxy resin to the polarizing plate 5 in a contact manner, it is possible to ensure a sufficient strength even if the glass substrate 101 in the TFT substrate 1 and the glass substrate 201 in the counter substrate 2 are reduced in thickness by polishing. Thus, it is possible to attain both reduction in thickness of the liquid crystal display panel and ensuring of a sufficient strength.

FIG. 18 shows an example in which the resin film 6 is disposed more closely to the observer compared with the polarizing plate 5 However, this configuration is not limited, and the resin film 6 may be affixed between the glass substrate 201 in the counter substrate 2 and the polarizing plate 5 or to the back surface of the glass substrate 101 in the TFT substrate 1.

Although in each of the above embodiments reference is made to an example in which the present invention is applied to a liquid crystal display panel, the present invention is applicable also to other display panels, e.g., a display panel in a self-light emission type display using organic EL (Electro Luminescence).

Figure 19:
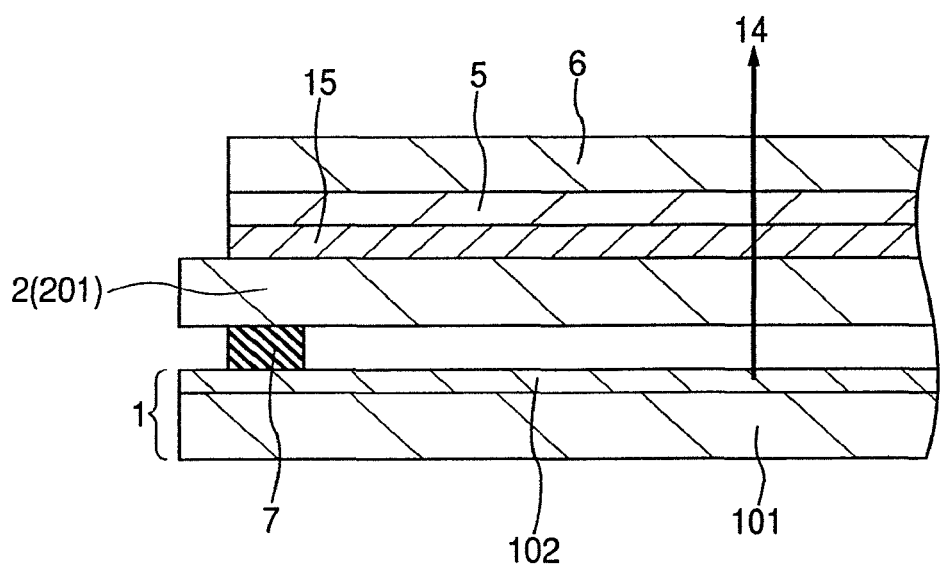
FIG. 19 is a schematic sectional view showing a schematic configuration of an organic EL panel to which the present invention is applied.

FIG. 19 is a schematic sectional view showing a schematic configuration in which the present invention is applied to an organic EL panel.

For example as shown in FIG. 19, the organic EL panel includes a TFT substrate 1, a counter substrate 2 (glass substrate 201), as well as a phase difference plate 15 and an upper polarizing plate 5 both affixed to the counter substrate 2. In the case of applying the configuration of the first embodiment to this panel, there is provided a resin film 6 affixed in contact with the upper polarizing plate 5 which is disposed on the counter substrate 2 side.

In the organic EL panel, the upper polarizing plate 5 and a phase difference plate 15 are combined together to form a circularly polarizing plate, thereby preventing extraneous light from being reflected (preventing extraneous light from entering an image display area in the display panel). For the phase difference plate 15, for example, only a quarter-wave phase difference plate may be used, or both a quarter-wave phase difference plate and a half-wave phase difference plate may be used in a stacked fashion. In particular, A combination of the upper polarizing plate 5 with a phase difference plate 15 having the quarter-wave phase difference plate and the half-wave phase difference plate stacked makes it possible to form a wide-band circularly polarizing plate.

In the organic EL panel, for example a light emitting layer using an organic EL material is provided in the multi-thin film layer 102 of the TFT substrate 1 and the gradation of each pixel is controlled by turning ON and OFF of the light emitting layer and by the luminance of light 14 during turning ON of the light emitting layer. Therefore, the space enclosed with the TFT substrate 1, counter substrate 2 and sealing member 7 is in a vacuum state. Further, unlike the liquid crystal display panel, a multi-thin film layer 202 may be absent in the counter substrate 2.

It goes without saying that the present invention is applicable not only to the liquid crystal display panel and the display panel using organic EL, but also to display panels similar in configuration to those panels.

What is claimed is:

1. A display device comprising display area and used in a hand-held electronic device comprising;
    a TFT substrate,
    a counter substrate,
    a multi-thin film layer,
    a liquid crystal layer, a seal member,
a polarizing plate,
an adhesive member, and
a protective member;
wherein the multi-thin film layer disposed on the TFT substrate,
wherein the liquid crystal layer disposed on the multi-thin film layer,
wherein the seal member surrounds the liquid crystal layer,
wherein the counter substrate is disposed between the TFT substrate and the polarizing plate,
wherein the polarizing plate is a separate member from the protective member and disposed between the counter substrate and the protective member,
wherein the adhesive member overlaps with the display area in a plan view, and is between the protective member and the polarizing plate, and
wherein the protective member is a protective cover of the hand-held electronic device,
wherein the protective member overlaps with the sealing member in a plan view, and
wherein a thickness of the protective member is at least 0.2 mm and no greater than 1.0 mm.

2. The display device according to claim 1, wherein a surface pencil hardness of the protective member is at least 3H.

3. The display device according to claim 1, wherein the counter substrate having a multi-thin film layer.

4. The display device according to claim 1, wherein the liquid crystal layer is sandwiched by the counter substrate and the TFT substrate.

5. The display device according to claim 1, wherein the multi-thin film layer includes plural insulating layers, conductive layer and organic layer.

6. A display device used in a hand-held electronic device comprising;
a first substrate,
a multi-thin film layer,
a seal member,
a polarizing plate,
an adhesive member, and
a protective member;
wherein the multi-thin film layer disposed on the first substrate,
wherein the seal member is disposed inside an outer periphery end face of the first substrate,
wherein the polarizing plate is a separate member from the protective member and disposed between the first substrate and the protective member,
wherein the adhesive member overlaps with the display area in a plan view, and is between the protective member and the polarizing plate, and
wherein the protective member is a protective cover of the hand-held electronic device,
wherein the protective member overlaps with the sealing member in a plan view, and
wherein a thickness of the protective member is at least 0.2 mm and no greater than 1.0 mm.

7. The display device according to claim 6, wherein a surface pencil hardness of the protective member is at least 3H.

8. The display device according to claim 6, wherein a second substrate is disposed between the first substrate and polarizing plate.

9. The display device according to claim 6, wherein the second substrate having a multi-thin film layer.

10. The display device according to claim 6, wherein a liquid crystal layer is sandwiched between the first substrate and the second substrate.

11. The display device according to claim 6, wherein the multi-thin film layer includes plural insulating layers, conductive layer and organic layer.

12. A display device used in a hand-held electronic device comprising;
a TFT substrate having a multi-thin film layer,
a resin film disposed over the TFT substrate,
a polarizing plate disposed on the resin film,
a protective member disposed on the polarizing plate, and
an adhesive member disposed between the polarizing plate and the protective member,
wherein the polarizing plate is a separate member from the protective member and the resin film,
wherein the adhesive member is disposed between the protective member and the polarizing member, and
wherein the protective member is a protective cover of the hand-held electronic device, and
wherein an edge of the protective member is disposed outside an edge of the resin film and an edge of the polarizing plate in a plan view.

13. The display device according to claim 12, wherein a surface pencil hardness of the protective member is at least 3H.

14. The display device according to claim 12, wherein a thickness of the protective member is at least 0.2 mm and no greater than 1.0 mm.

15. The display device according to claim 1, wherein an edge of the protective member is disposed outside an edge of the polarizing plate in a plan view.

16. The display device according to claim 6, wherein an edge of the protective member is disposed outside an edge of the polarizing plate in a plan view.

* * * * *